United States Patent
Keshet et al.

(10) Patent No.: US 8,457,429 B2
(45) Date of Patent: Jun. 4, 2013

(54) METHOD AND SYSTEM FOR ENHANCING IMAGE SIGNALS AND OTHER SIGNALS TO INCREASE PERCEPTION OF DEPTH

(75) Inventors: Renato Keshet, Hod Hasharon (IL); Mani Fischer, Haifa (IL); Doron Shaked, Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1232 days.

(21) Appl. No.: 11/888,573

(22) Filed: Jul. 31, 2007

(65) Prior Publication Data

US 2009/0034871 A1 Feb. 5, 2009

(51) Int. Cl.
*G06K 9/40* (2006.01)

(52) U.S. Cl.
USPC .......................................................... 382/254

(58) Field of Classification Search
USPC .................. 382/128, 134, 154, 173, 180, 274
See application file for complete search history.

(56) References Cited

U.S. PATENT DOCUMENTS

| | | | |
|---|---|---|---|
| 6,426,994 B1* | 7/2002 | Van Vaals | 378/98.12 |
| 6,453,075 B1* | 9/2002 | Gallagher et al. | 382/260 |
| 2004/0091164 A1* | 5/2004 | Sakatani et al. | 382/254 |
| 2007/0206848 A1* | 9/2007 | Ohishi | 382/154 |

OTHER PUBLICATIONS

Sobol, "Improving the Retinex algorithm for rendering wide dynamic range photographs", Jan. 2004, Journal of Electronic Imaging, vol. 13, pp. 65-74.*

* cited by examiner

*Primary Examiner* — Edward Park

(57) ABSTRACT

Various embodiments of the present invention are directed to methods and systems for processing signals, particularly signals encoding two-dimensional images, such as photographs, video frames, graphics, and other visually displayed information. Rather than attempting 3D-boosting by attempting a global contrast enhancement, method and system embodiments of the present invention generate a soft-segmented image that is separately contrast enhanced, segment-by-segment, to produce an enhanced soft-segmented image. A details image is then computed, and is combined with the enhanced soft-segmented image to produce an intermediate image, the brightness of which is adjusted to produce a 3D-boosted output image. Local contrast enhancement provides for proportional enhancement of homogenous regions, resulting in 3D-boosting without introduction of anomalies, artifacts, and distortion.

8 Claims, 35 Drawing Sheets

202  Y(2,8) = 97

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Figure 2

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

402

$H(1,2) = 0.1$

404

$m = 3$

| 0 | 0 | 0 | 0 | 0 | 5 | 5 | 5 | 5 | 5 | 5 | 0 | 0 | 0 | 0 | 0 | 0 |
|---|---|---|---|---|---|---|---|---|---|---|---|---|---|---|---|---|
| 0 | 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 | 0 |
| 0 | 0 | 0 | 10 | 80 | 96 | 46 | 40 | 47 | 91 | 73 | 10 | 5 | 0 | 0 | 0 | 0 |
| 0 | 0 | 0 | 16 | 95 | 50 | 10 | 11 | 87 | 49 | 93 | 10 | 5 | 0 | 0 | 0 | 0 |
| 0 | 0 | 0 | 11 | 98 | 34 | 9 | 8 | 8 | 43 | 94 | 19 | 5 | 0 | 0 | 0 | 0 |
| 0 | 0 | 0 | 10 | 91 | 41 | 7 | 6 | 6 | 45 | 95 | 18 | 5 | 0 | 0 | 0 | 0 |
| 0 | 0 | 0 | 5 | 81 | 90 | 45 | 44 | 43 | 98 | 79 | 10 | 5 | 0 | 0 | 0 | 0 |
| 0 | 0 | 0 | 5 | 16 | 79 | 93 | 95 | 97 | 80 | 20 | 5 | 0 | 0 | 0 | 0 | 0 |
| 0 | 0 | 0 | 5 | 5 | 10 | 16 | 17 | 13 | 10 | 5 | 0 | 0 | 0 | 0 | 0 | 0 |
| 0 | 0 | 0 | 0 | 5 | 5 | 5 | 5 | 5 | 5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

| | 0 | 0 | | | | | | | | | | | | | | |
|---|---|---|---|---|---|---|---|---|---|---|---|---|---|---|---|---|
| | | | | | | | | | | | | | | | | |

Figure 4C

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | 1 | | | | | | | | | | | | | |
|---|---|---|---|---|---|---|---|---|---|---|---|---|---|---|---|
| | | | | | | | | | | | | | | | |

Figure 4D

*case X even; Y odd*

$$k = l_s(x,y) = f(s) \cdot RI(f_{s+1}, f_s) = fs - \frac{g_E w_E + g_W W_W}{W_E + W_W} = fs - \frac{a((f-e)<T) + b((d-e)<T)}{((f-e)<T) + ((d-e)<T)}$$

case X odd; Y odd $$k = l_s(x,y) = f_S - RI(f_{s+1}, f_s) = f_S - \frac{g_{NE}w_{NE} + g_{NW}w_{NW} + g_{SE}w_{SE} + g_{SW}w_{SW}}{w_{NE} + w_{NW} + w_{SE} + w_{SW}} = \frac{a((f-e)<T) + b((f-g)<T) + c((f-h)<T) + d((f-i)<T)}{((f-e)<T) + ((f-g)<T) + ((f-h)<T) + ((f-i)<T)}$$

METHOD AND SYSTEM FOR ENHANCING IMAGE SIGNALS AND OTHER SIGNALS TO INCREASE PERCEPTION OF DEPTH

TECHNICAL FIELD

The present invention is related to signal processing and, in particular, to a computationally efficient and effective method and system for enhancing image signals to increase the depth perceived by viewers of two-dimensional images rendered from the image signals without introducing anomalies, artifacts, and discontinuities into the image signals.

BACKGROUND OF THE INVENTION

Computational methods for signal processing provide foundation technologies for many different types of systems and services, including systems and services related to recording, transmission, and rendering of signals that encode images and graphics, including photographic images, video signals, and other such signals. Over the years, many different types of image-enhancement functionalities have been devised and implemented, including computational routines and/or logic circuits that implement sharpening, contrast enhancement, denoising, and other image-enhancement functionalities. Contrast enhancement is a general term to describe a number of different types of enhancements, including global enhancements such as brightening, darkening, histogram stretching or equalization, gamma correction, and others, as well as local enhancements, including shadow lighting, adaptive lighting, highlight enhancement, and others. Many contrast enhancement algorithm are successful in producing certain of the above enhancements, but are not successful in achieving other types of enhancements. In particular, significant research and development efforts have been directed to developing techniques for enhancing image signals to increase appreciation, by viewers, of two-dimensional images rendered from the image signals. Unfortunately, contrast enhancement techniques often result in uneven effects, and may lead to introduction of perceptible anomalies and artifacts. For these reasons, designers, developers, vendors, and users of image-enhancement software, image-enhancement-related logic circuits, image-enhancement-related systems and devices, and a large number of different types of devices that include image-enhancement functionality have all recognized a need to continue to devise and develop improved computational methods for well-known and new contrast enhancements as well as systems that provide more natural, computationally efficient contrast enhancement of two-dimensional images and other signals, including signals that encode video frames, graphics, and other visually displayed information.

SUMMARY OF THE INVENTION

Various embodiments of the present invention are directed to methods and systems for processing signals, particularly signals encoding two-dimensional images, such as photographs, video frames, graphics, and other visually displayed information. Rather than attempting 3D-boosting by attempting a global contrast enhancement, method and system embodiments of the present invention generate a soft-segmented image that is effectively locally contrast enhanced to produce a 3D-boosted output image. Local contrast enhancement provides for proportional enhancement of homogenous regions, and can result in 3D-boosting without introduction of anomalies, artifacts, and distortion.

BRIEF DESCRIPTION OF THE DRAWINGS

FIG. 2 shows the two-dimensional image of FIG. 1 with numerical pixel values.

FIGS. 4A-E illustrate a convolution operation.

DETAILED DESCRIPTION OF THE INVENTION

Examples herein are directed to computationally efficient and effective methods and systems for enhancing image signals to increase the depth perceived by viewers of two-dimensional images rendered from the image signals. In the following discussion, image signals and various mathematical operations carried out on image signals are first discussed, in a number of short subsections. Then, example systems and methods are discussed at an overview level. Finally, a detailed description of portions of one example is provided in a final subsection. The methods and system can be implemented, for example by a signal-processing system, such as a computer. In such a situation, the signal-processing system can include a memory for storing machine readable instructions. The memory could be implemented, for example, as a non-transitory computer readable medium, such as random access memory (RAM), a hard disk, etc. The signal-processing system can also include a processing unit (e.g., a processor core) for accessing the memory and executing the machine readable instructions.

Images

Figure 1:
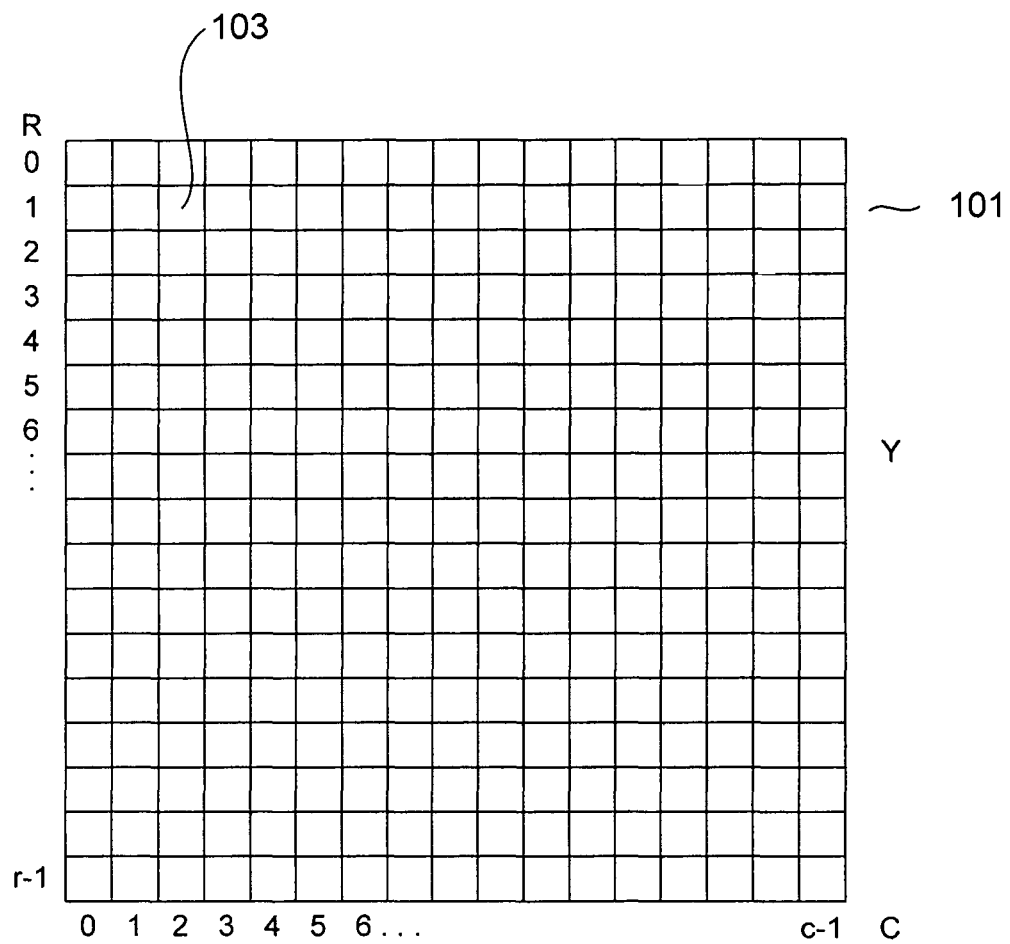
FIG. 1 illustrates a two-dimensional image signal.

FIG. 1 illustrates a two-dimensional image signal. As shown in FIG. 1, the two-dimensional image signal can be considered to be a two-dimensional matrix 101 containing R rows, with indices 0, 1, . . . , r-1, and C columns, with indices 0, 1, . . . , c-1. In general, a single upper-case letter, such as the letter "Y," is used to present an entire image. Each element, or cell, within the two-dimensional image Y shown in FIG. 1 is referred to as a "pixel" and is referred to by a pair or coordinates, one specifying a row and the other specifying a column in which the pixel is contained. For example, cell 103 in image Y is represented as Y(1,2).

FIG. 2 shows the two-dimensional image of FIG. 1 with numerical pixel values. In FIG. 2, each pixel is associated with a numerical value. For example, the pixel Y(2,8) 202 is shown, in FIG. 2, having the value "97." In certain cases, particularly black-and-white photographs, each pixel may be associated with a single, grayscale value, often ranging from 0, representing black, to 255, representing white. For color photographs, each pixel may be associated with multiple numeric values, such as a luminance value and two chrominance values, or, alternatively, three RBG values. In cases in which pixels are associated with more than one value, image-enhancement techniques may be applied separately to partial images, each representing a set of one type of pixel value selected from each pixel, image-enhancement techniques may be applied to a computed, single-valued-pixel image in which a computed value is generated for each pixel by a mathematical operation on the multiple values associated with the pixel in the original image, or image-enhancement techniques may be primarily applied to only the luminance partial image. In the following discussion, images are considered to be single-valued, as, for example, grayscale values associated with pixels in a black-and-white photograph. However, the disclosed methods of the present invention may be straightforwardly applied to images and signals with multi-valued pixels, either by separately sharpening one or more partial images or by combining the multiple values associated with each pixel mathematically to compute a single value associated with each pixel, and sharpening the set of computed values. It should be noted that, although images are considered to be two-dimensional arrays of pixel values, images may be stored and transmitted as sequential lists of numeric values, as compressed sequences of values, or in other ways. The following discussion assumes that, however images are stored and transmitted, the images can be thought of as two-dimensional matrices of pixel values that can be transformed by various types of operations on two-dimensional matrices.

In the following subsections, a number of different types of operations carried out on two-dimensional images are described. These operations range from simple numeric operations, including addition and subtraction, to convolution, scaling, and robust filtering. Following a description of each of the different types of operations, in separate subsections, a final subsection discusses embodiments of the present invention implemented using these operations.

Image Subtraction and Addition

Figure 3:
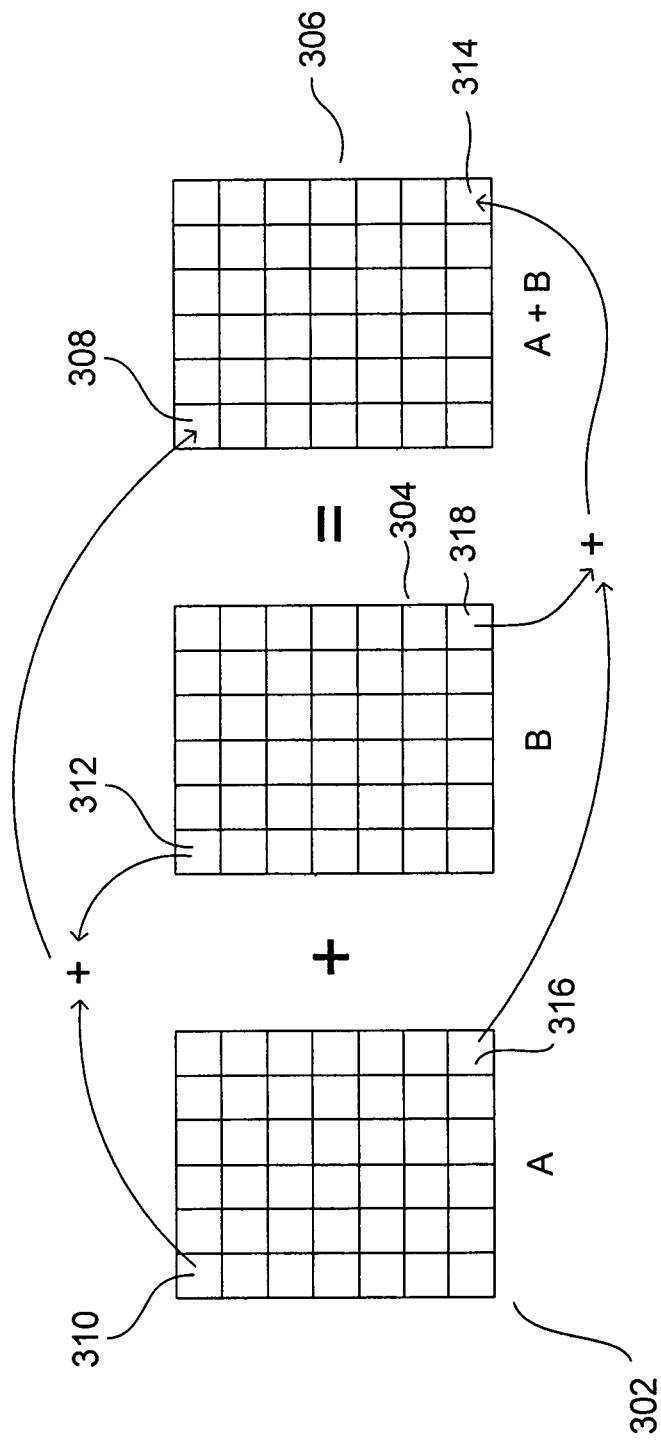
FIG. 3 illustrates addition of two images A and B.

FIG. 3 illustrates addition of two images A and B. As shown in FIG. 3, addition of image A 302 and image B 304 produces a result image A+B 306. Addition of images is carried out, as indicated in FIG. 3, by separate addition of each pair of corresponding pixel values of the addend images. For example, as shown in FIG. 3, pixel value 308 of the result image 306 is computed by adding the corresponding pixel values 310 and 312 of addend images A and B. Similarly, the pixel value 314 in the resultant image 306 is computed by adding the corresponding pixel values 316 and 318 of the addend images A and B. Similar to addition of images, an image B can be subtracted from an image A to produce a resultant image A−B. For subtraction, each pixel value of B is subtracted from the corresponding pixel value of A to produce the corresponding pixel value of A−B. Images may also be pixel-by-pixel multiplied and divided.

Convolution

Figure 4A:
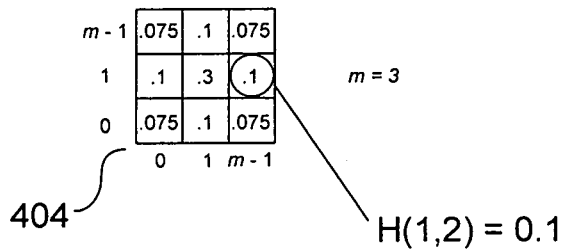

A second operation carried out on two-dimensional images is referred to as "convolution." FIGS. 4A-E illustrate a convolution operation. Convolution involves, in general, an image 402 and a mask 404. The mask 404 is normally a small, two-dimensional array containing numeric values, as shown in FIG. 4A, but may alternatively be a second image. Either an image or a mask may have a different number of rows than columns, but, for convenience, the example images and masks used in the following discussion are generally shown as square, with equal numbers of rows and columns. The image Y 402 in FIG. 4A has 17 rows and columns, while the mask 404 H has three rows and columns.

Figure 4B:
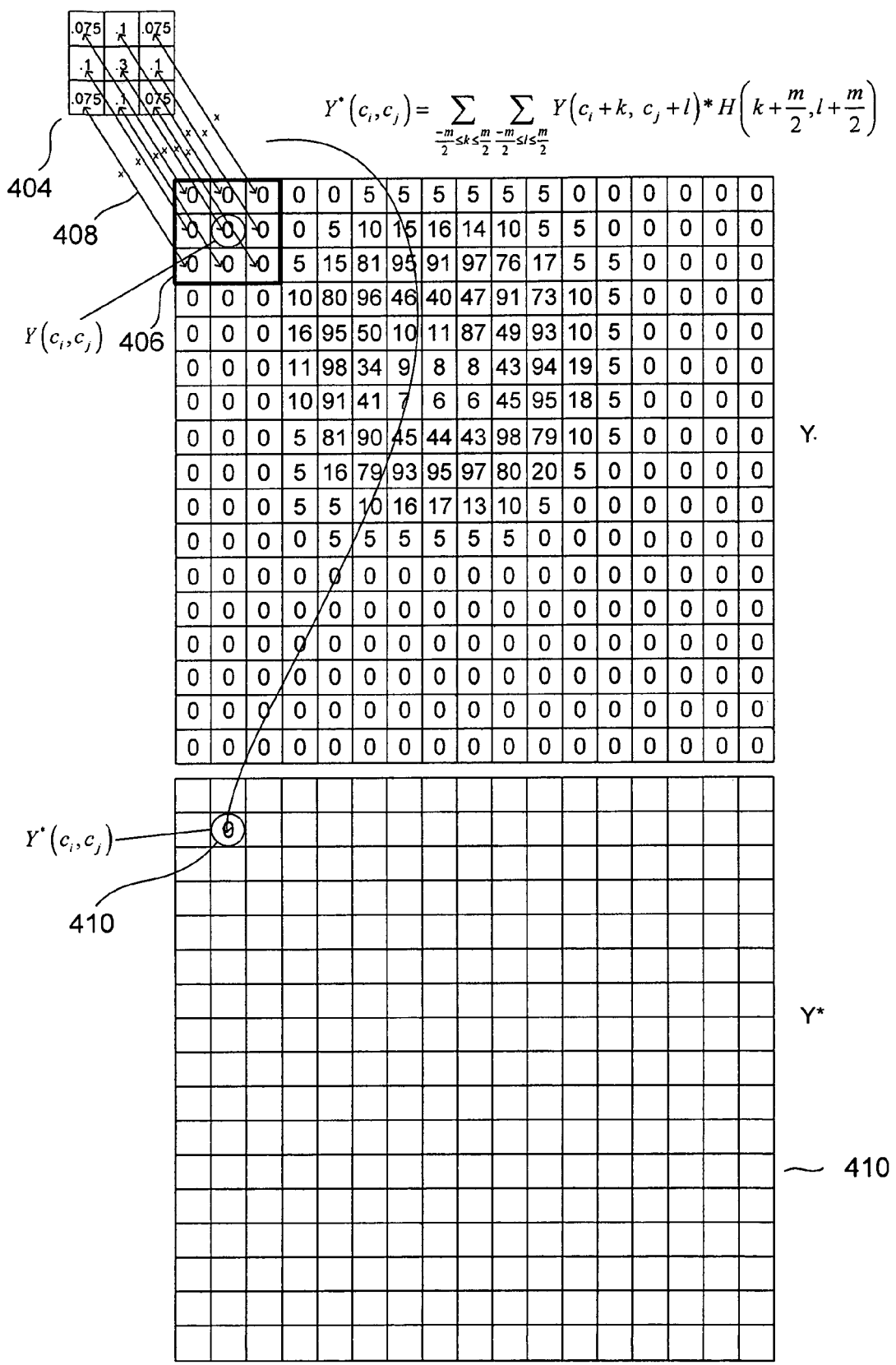

FIG. 4B illustrates computation of the first cell value, or pixel value, of the image Y* that is the result of convolution of image Y with mask H, expressed as:

$$Y^* = Y \otimes H$$

As shown in FIG. 4B1, the mask H 404 is essentially overlaid with a region of corresponding size and shape 406 of the image centered at image pixel Y(1,1). Then, each value in the region of the image 406 is multiplied by the corresponding mask value, as shown by the nine arrows, such as arrow 408, in FIG. 4B. The value for the corresponding pixel Y*(1,1) 410 is generated as the sum of the products of the nine multiplications. In the general case, Y* $(c_i, c_j)$ is computed as follows:

$$Y^*(c_i, c_j) = \sum_{-\frac{m}{2} \leq k \leq \frac{m}{2}} \sum_{-\frac{m}{2} \leq l \leq \frac{m}{2}} Y(c_i + k, c_j + l) * H\left(k + \frac{m}{2}, l + \frac{m}{2}\right)$$

where m is the size of each dimension of H, and k and l have only integer values within the ranges $$\frac{-m}{2} \le k \le \frac{m}{2} \text{ and } \frac{-m}{2} \le l \le \frac{m}{2} \text{ and } k + \frac{m}{2} \text{ and } l + \frac{m}{2}$$

also take on only integer values. FIGS. 4C and 4D illustrate computation of the second and third values of the resultant image Y*. Note that, because the mask H is a 3×3 matrix, the mask cannot be properly overlaid with image pixels along the border of image Y. In certain cases, special border masks may be used on boundary pixels, such as, for example, 2×3 masks for interior, horizontal boundary regions. In other cases, the boundary pixel values are simply transferred to the resultant image, without a mask-based transformation. In still other cases, the boundary pixels are omitted from the resultant image, so that the resultant image has fewer rows and columns than the original image. Details of treatment of boundary regions are not further discussed in the current application. It is assumed that any of the above-mentioned techniques for handling boundary pixels, or other appropriate techniques, may be applied to handle boundary pixels.

Figure 4E:
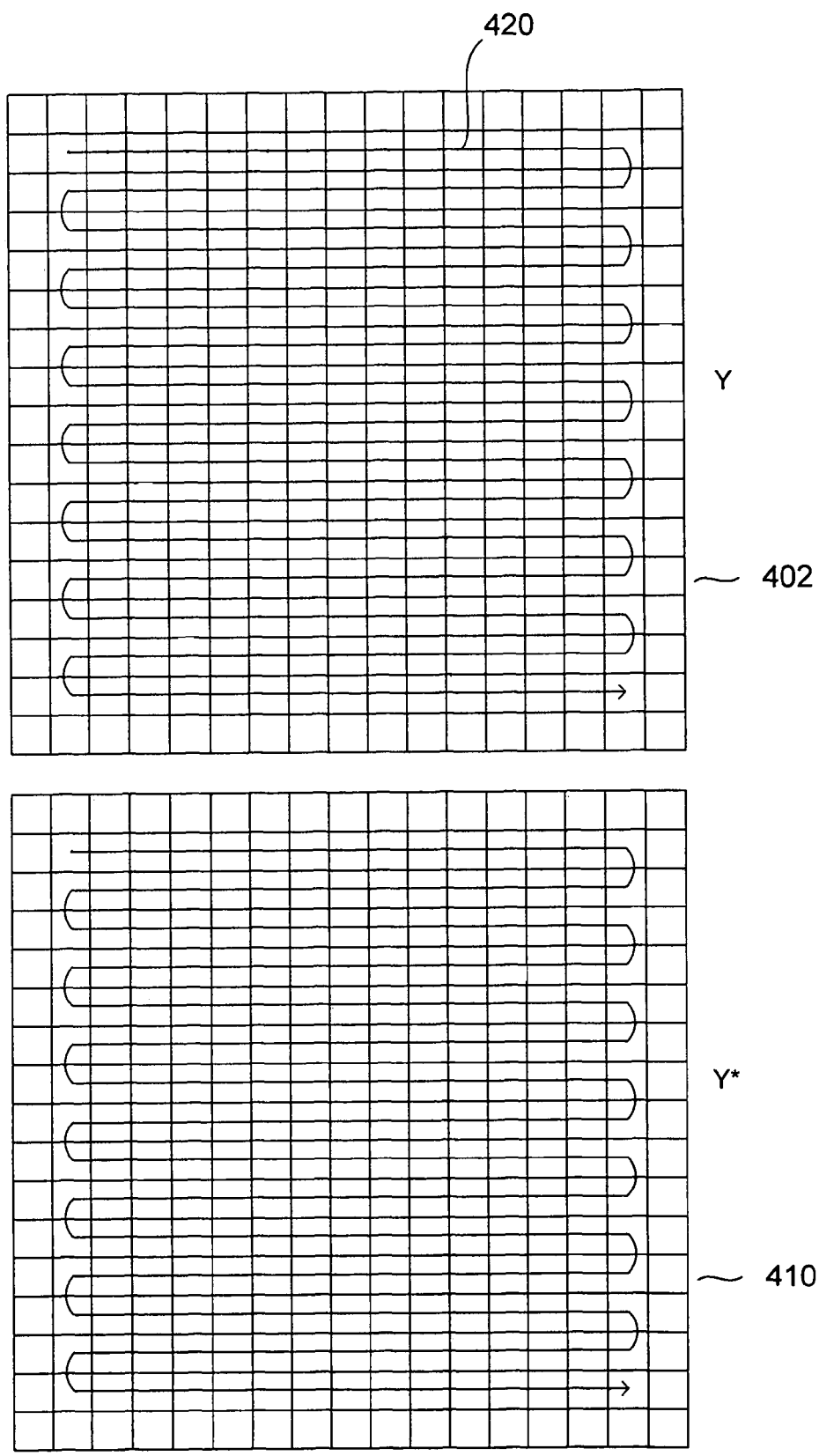

FIG. 4E illustrates a path of application of the mask H to image Y during convolution of Y×H to produce image Y*. In FIG. 4E, the path is represented by the curved arrow 420 and shows the series of successive pixels on which the mask is centered in order to generate corresponding values for the resultant image Y* 410. In alternative embodiments, a different ordering of individual mask-based operations may be employed. However, in all cases, a single mask-based operation, such as that shown in FIG. 4B, is applied to each non-boundary pixel of image Y in order to produce a corresponding value for the resultant image Y*.

Scaling

Figure 5:
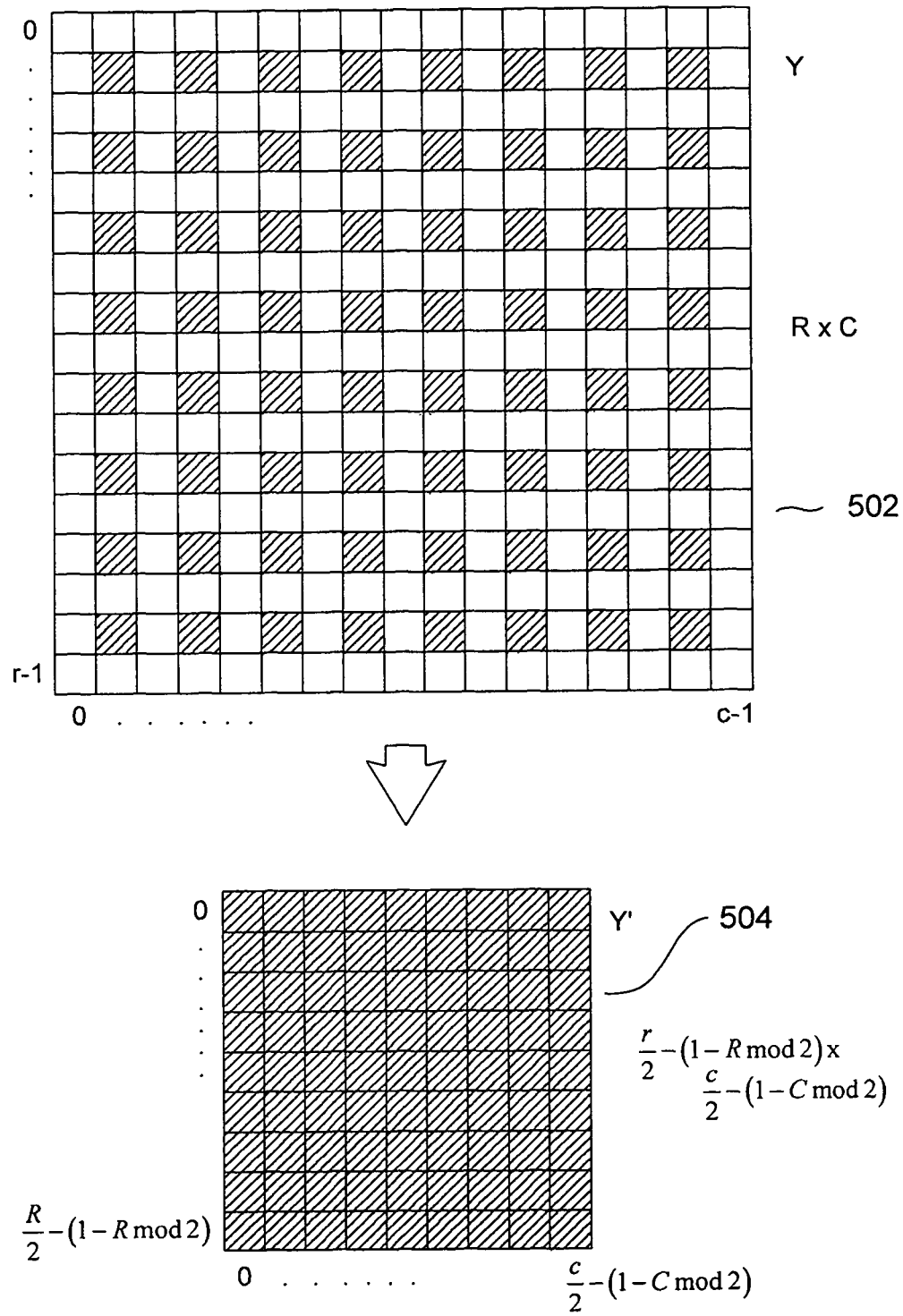
FIG. 5 illustrates one type of scaling operation, referred to as "downscaling."

FIG. 5 illustrates one type of scaling operation, referred to as "down scaling." As shown in FIG. 5, a first, original image Y 502 may be downscaled to produce a smaller, resultant image Y' 504. In one approach to downscaling, every other pixel value, shown in original image Y in FIG. 5 as cross-hatched pixels, is selected and combined together with the same respective positions in order to form the smaller, resultant image Y' 504. As shown in FIG. 5, when the original image Y is a R×C matrix, then the downscaled image Y' is an $$\left[\frac{R}{2} - (1 - R \bmod 2)\right] \times \left[\frac{C}{2} - (1 - C \bmod 2)\right]$$

image. The downscaling shown in FIG. 5 decreases each dimension of the original two-dimensional matrix by an approximate factor of ½, thereby creating a resultant, downsized image Y' having ¼ of the number of pixels as the original image Y. The reverse operation, in which a smaller image is expanded to produce a larger image, is referred to as upscaling. In the reverse operation, values need to be supplied for ¾ of the pixels in the resultant, larger image that are not specified by corresponding values in the smaller image. Various methods can be used to generate these values, including computing an average of neighboring pixel values, or by other techniques. In FIG. 5, the illustrated downscaling is a ½×½ downscaling. In general, images can be downscaled by arbitrary factors, but, for convenience, the downscaling factors generally select, from the input image, evenly spaced pixels with respect to each dimension, without leaving larger or unequally-sized boundary regions. Images may also be downscaled and upscaled by various non-linear operations, in alternative types of downscaling and upscaling techniques.

Lookup-Table Operations

Figure 6:
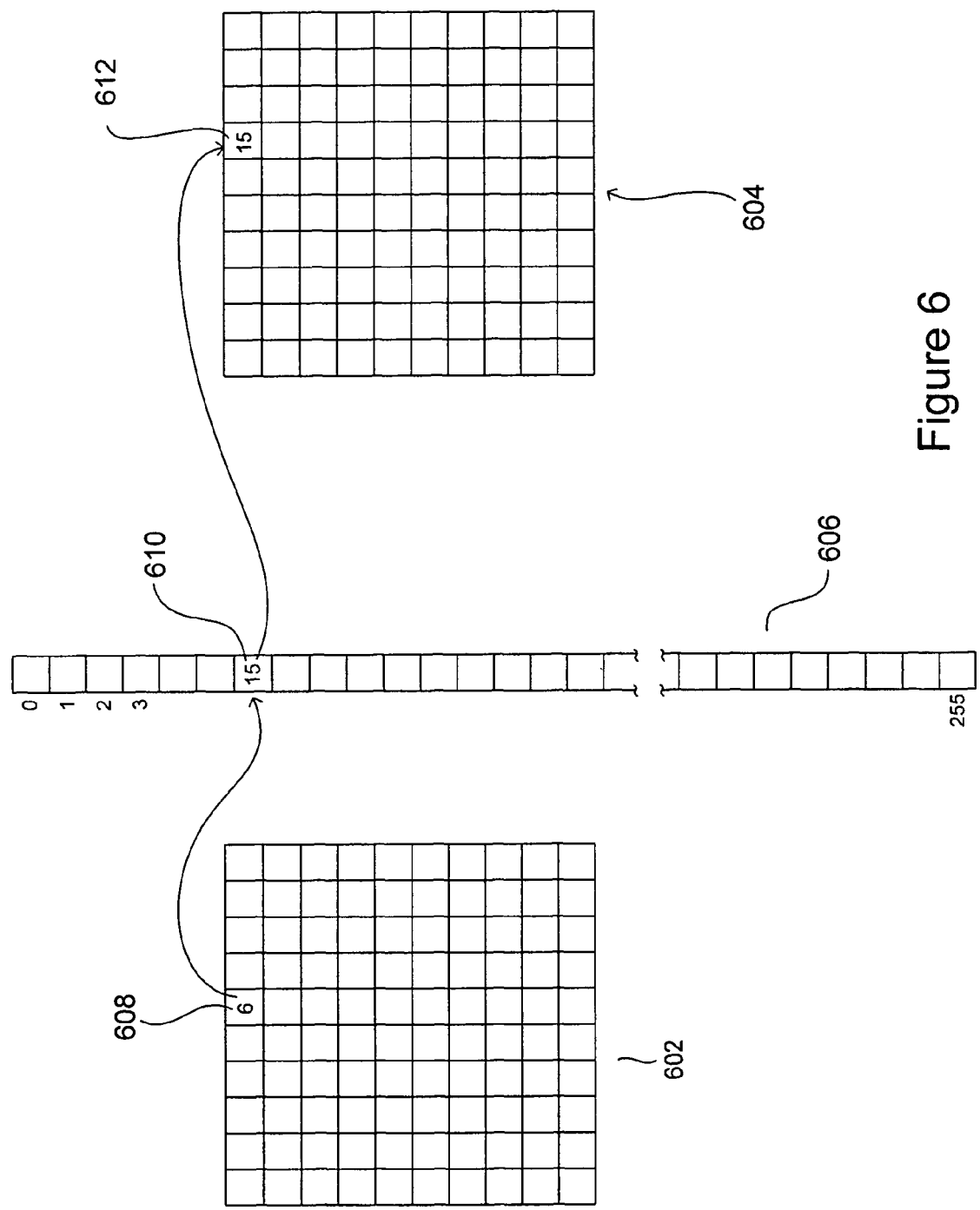
FIG. 6 illustrates a lookup-table operation.

FIG. 6 illustrates a lookup-table operation. A lookup-table operation is essentially application of any function that can be expressed or approximated as a set of discrete values to an image to produce a transformed image. FIG. 6 shows a first image 602 transformed by a lookup-table operation to produce a second, transformed image 604. In the lookup-table operation illustrated in FIG. 6, the lookup table 606 is a set of 256 values that together represent a function that transforms any grayscale or luminance value in the original image 602 to a corresponding, transformed grayscale or luminance value in the transformed image 604. In general, a luminance or grayscale value, such as the value "6" 608 in the original image 602, is used as an index into the lookup table, and the contents of the lookup table indexed by that value are then used as the corresponding transformed value for the transformed image. As shown in FIG. 6, the original-image grayscale or luminance value "6" indexes the seventh element 610 of the lookup table that contains the value "15." The value "15" is then inserted into the pixel position 612 of the transformed image 604 corresponding to the position of the pixel of the original image from which the index value is extracted. In a lookup-table operation, each luminance or grayscale value in the original image is transformed, via the lookup table, to a transformed value inserted into a corresponding position of the transformed image. Thus, a lookup-table operation is a pixel-by-pixel operation. In certain cases, two-dimensional or higher-dimensional lookup tables may be employed, when pixels are associated with two or more values, or when two or more pixel values are used for each pixel-value-generation operation. For example, a lookup-table operation may be used to transform a multi-value-pixel image to a single-value-pixel image. Any of a large number of different functions can be modeled as lookup-table operations. For example, any function that can be applied to the possible values in the original image to produce transformed values can be modeled as a lookup-table operation by applying the function to the possible values to generate corresponding transformed values and including the transformed values in a lookup table used to implement the lookup-table operation.

Figure 7A:
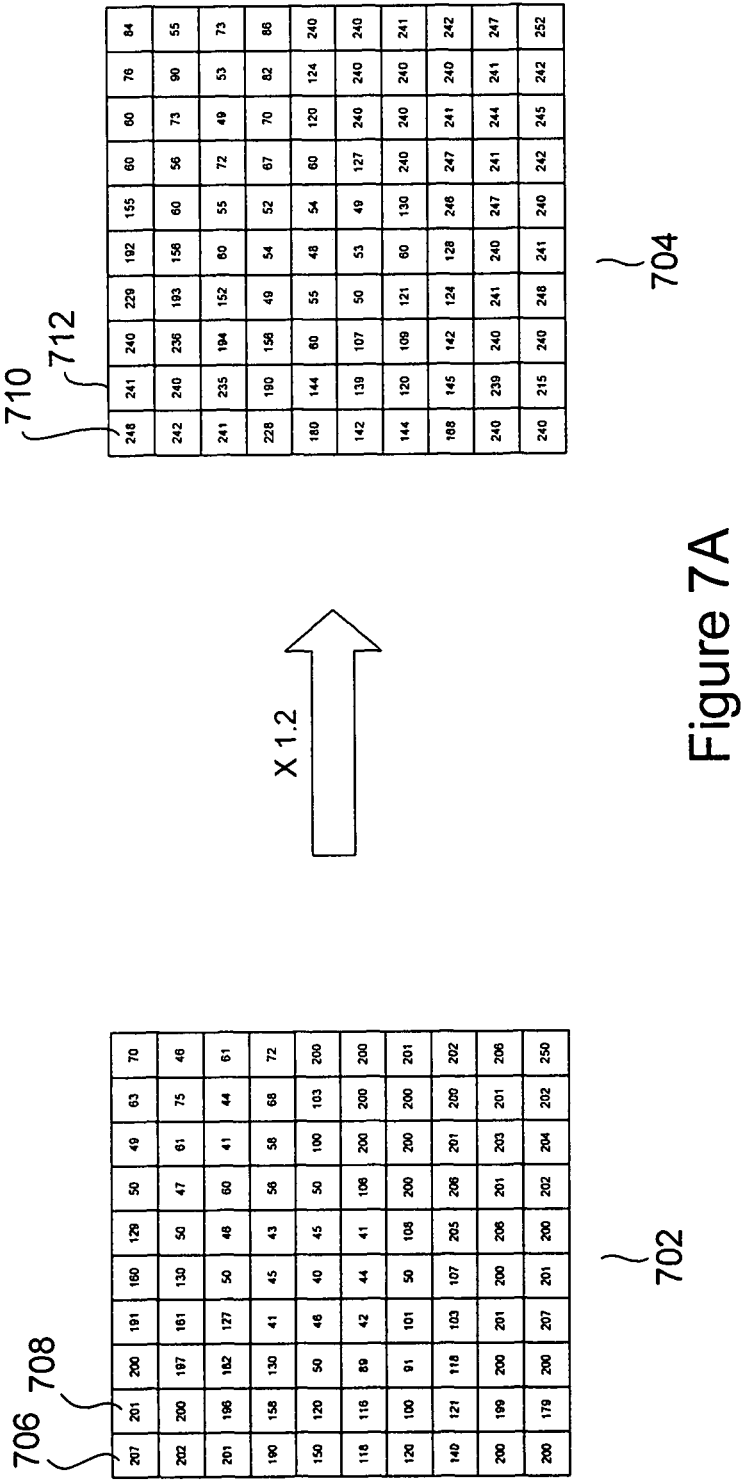
FIG. 7A illustrates one simple method of contrast enhancement.

3D Boosting 3D-boosting is accomplished by enhancing contrast within an image, such that differences between shaded and illuminated objects and portions of objects within a two-dimensional image are made more perceptible and visually distinguishable by a viewer. FIG. 7A illustrates one simple method of contrast enhancement. In FIG. 7A, a small original image 702 is contrast enhanced to produce a resulting contrast-enhanced image 704 by multiplying each grayscale or luminance value within the original image by a constant, in the case of FIG. 7A, the numerical value 1.2. By multiplying the luminance or grayscale values of an original image by a constant greater than 1.0, the differences, in magnitude, in grayscale or luminance value between adjacent pixels is magnified. For example, consider, in FIG. 7A, the first two grayscale values 706 and 708 of the original image 702. In the original image, the difference between these two values is 6.

Following the transformation to a contrast-enhanced image 704, the difference between corresponding grayscale values 710 and 712 is 7.

Figure 7B:
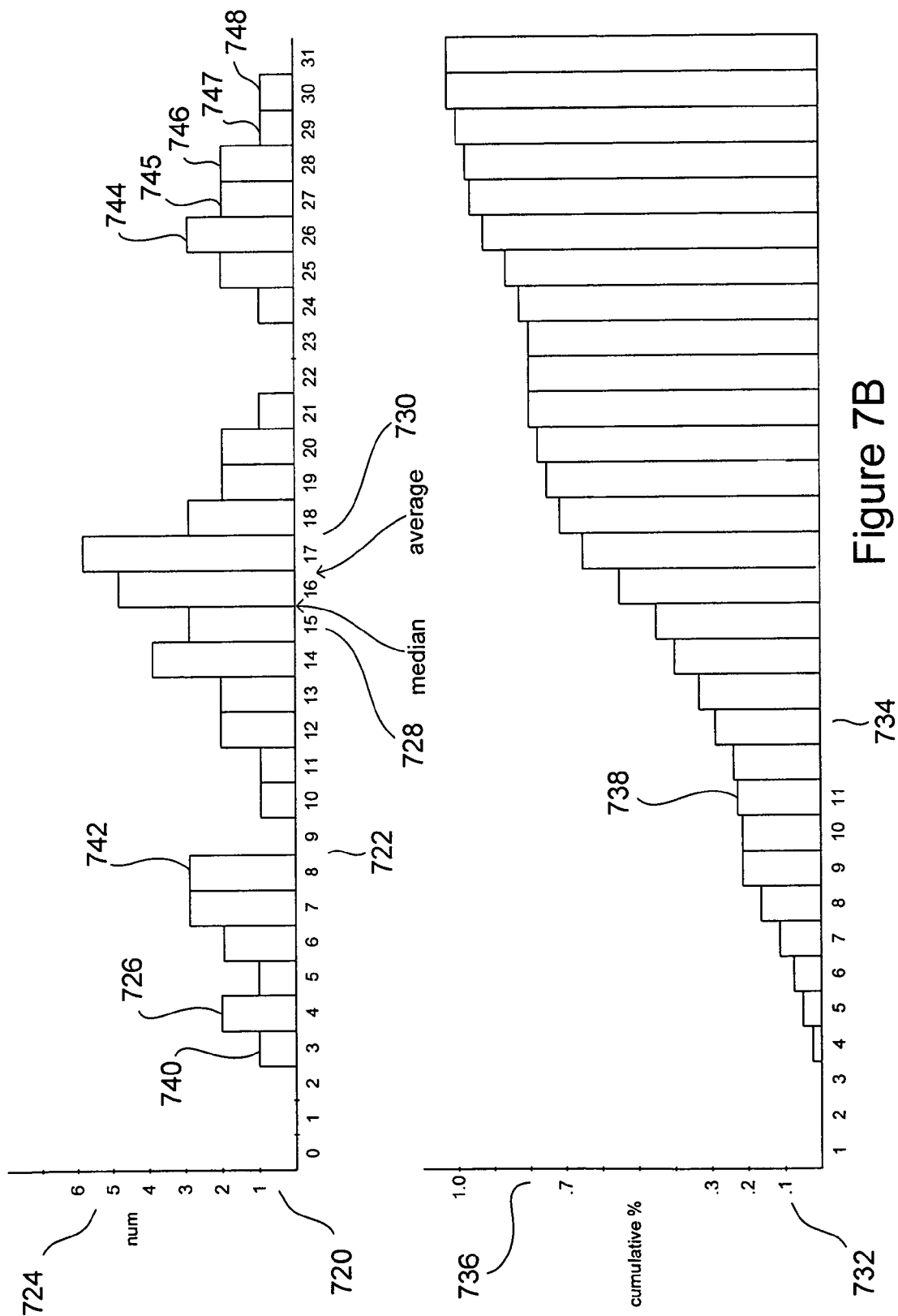
FIG. 7B shows a histogram and cumulative histogram for a tiny, hypothetical image containing 56 pixels, each having one of 32 grayscale values.

Unfortunately, simple global-contrast-enhancement techniques do not provide for a desired, natural 3D-boosting, but instead may introduce distortion and artifacts into an image. FIG. 7B shows a histogram and cumulative-distribution histogram for a tiny, hypothetical image containing 56 pixels, each having one of 32 grayscale values. The histogram 720 shows, with bar-like columns, the number of pixels having each of the possible 32 grayscale values. The 32 grayscale values are plotted along the horizontal axis 722, and the number of pixels having each value is plotted along the vertical axis 724. Thus, for example, two pixels in the image have the grayscale value "4," as indicated by column 726 in the histogram. The median grayscale value 728 can be computed as falling between grayscale values 15 and 16, and the average grayscale value 730 for the image can be computed as 16. The cumulative-distribution histogram 732 shows the fraction of pixels having each grayscale value and all smaller grayscale values. The grayscale values are again plotted along the horizontal axis 734, and the fractions of pixels in the image having particular grayscale values or any grayscale value smaller than the particular grayscale values is plotted with respect to the vertical axis 736. For example, column 738 in the cumulative-distribution histogram indicates that 25 percent of the pixels in the image have grayscale values equal to, or less than, 11.

Figure 7C:
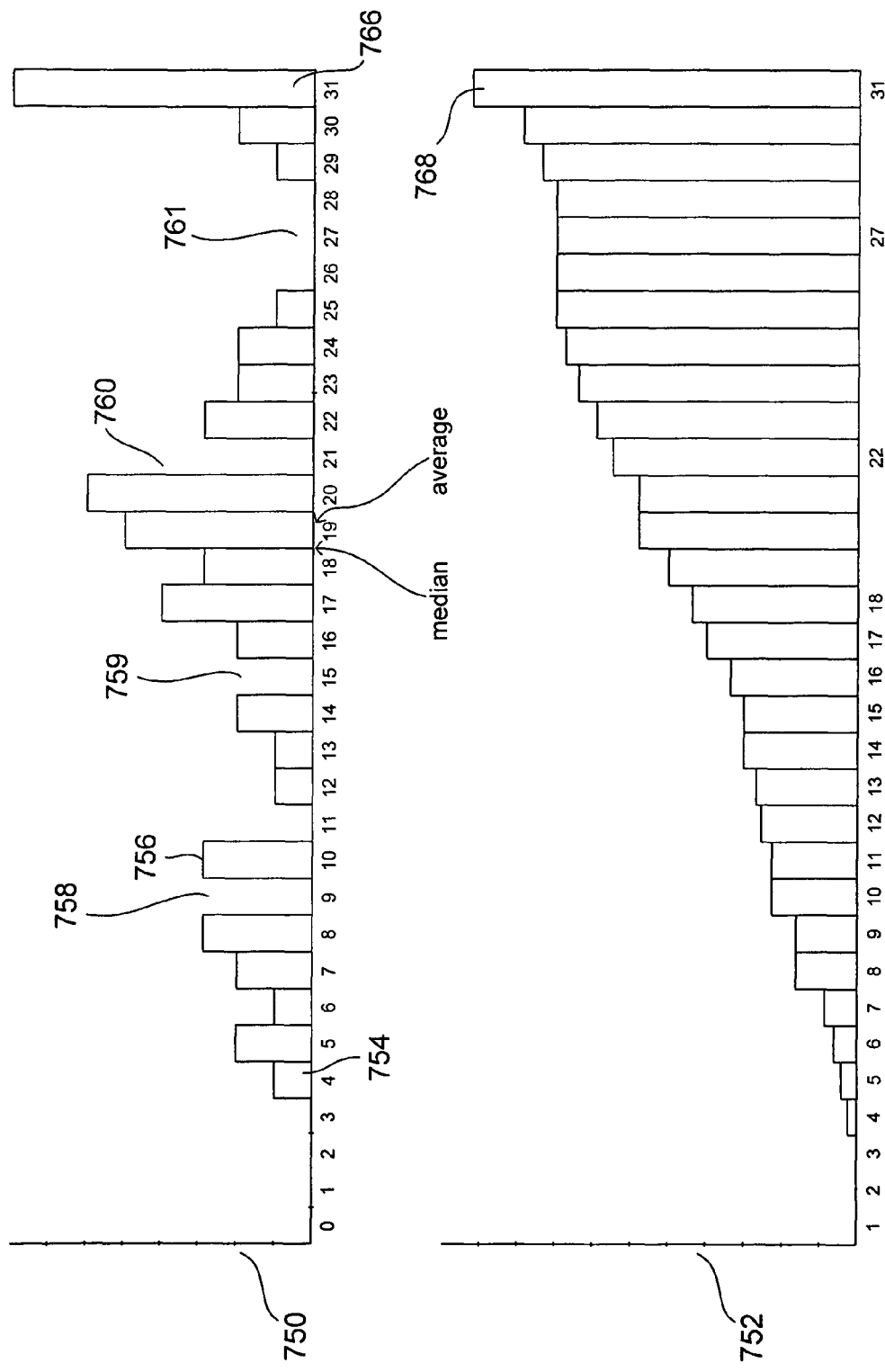
FIG. 7C shows the histogram and cumulative histogram for the image, discussed with reference to FIG. 7B, following contrast enhancement by multiplying the pixels of the original image by the constant factor 1.2.

FIG. 7C shows the histogram and cumulative histogram for the image, discussed with reference to FIG. 8, following contrast enhancement by multiplying the pixels of the original image by the constant factor 1.2. By comparing the histogram 750 for the contrast-enhanced image and the cumulative-distribution histogram 752 for the contrast-enhanced image with respect to the histogram and cumulative histogram for the original image (720 and 732 in FIG. 7B), various problems associated with global contrast enhancement can be seen. In general, the contrast-enhancement technique has shifted the bars of the histogram for the globally enhanced image rightward with respect to the columns in the histogram for the original image. For example, column 754 in the histogram for the contrast-enhanced image corresponds to column 740 in the histogram for the original image. Column 754 appears at grayscale-magnitude "4," while column 740 appears at grayscale magnitude "3." However, the rightward shifting is not uniform. While the first five columns have been shifted rightward by one position, or grayscale value, in the histogram for the globally enhanced image, the sixth column 756 has been shifted rightward by two positions with respect to the corresponding column 742 in the histogram for the original image. Thus, every sixth column in the histogram for the globally enhanced image is shifted rightward by an additional position, leaving blank columns at every sixth position 758-761. These blank columns were not present in the histogram for the original image. Thus, the shape of the original histogram has been somewhat distorted by the global-enhancement technique of multiplying grayscale values by a constant greater than 1.0. While this distortion is quite inconsequential, in the case illustrated in FIGS. 7B-C, more serious and perceptible distortions may arise by non-uniform changes made to pixel values as a result of a global enhancement technique.

In addition, consider the final five columns of the histogram for the original image 744-748. In the histogram for the globally enhanced image, all five of these columns have been compressed into a single column 766. Note also that the shape of the cumulative distribution histogram 752 for the globally enhanced image is different from that for the original image (732 in FIG. 7B). The cumulative-distribution histogram is rightward shifted, as with the histogram, but there is now a relatively sharp discontinuity with respect to the final peak 768 not present in the cumulative-distribution histogram for the original image 732. This effect is referred to as "saturation." Large-magnitude values may be compressed into a single, largest-magnitude value by constant-multiplication amplification, and small-magnitude values may be compressed into a single, low-magnitude value by constant-multiplication compression.

A much greater problem is that, in general, when one portion of an image is amplified, some other portion of the image must be correspondingly compressed in order to avoid an overall brightness change. In other words, if a portion of the image is amplified by multiplying the pixel values in that portion of the image by a constant greater than 1.0, then another portion of the image needs to be compressed by multiplying the pixel values in that portion of the image by a constant less than 1.0. Such amplification and compression in different regions of the image may lead to quite perceptible artifacts and distortions.

Figure 8A:
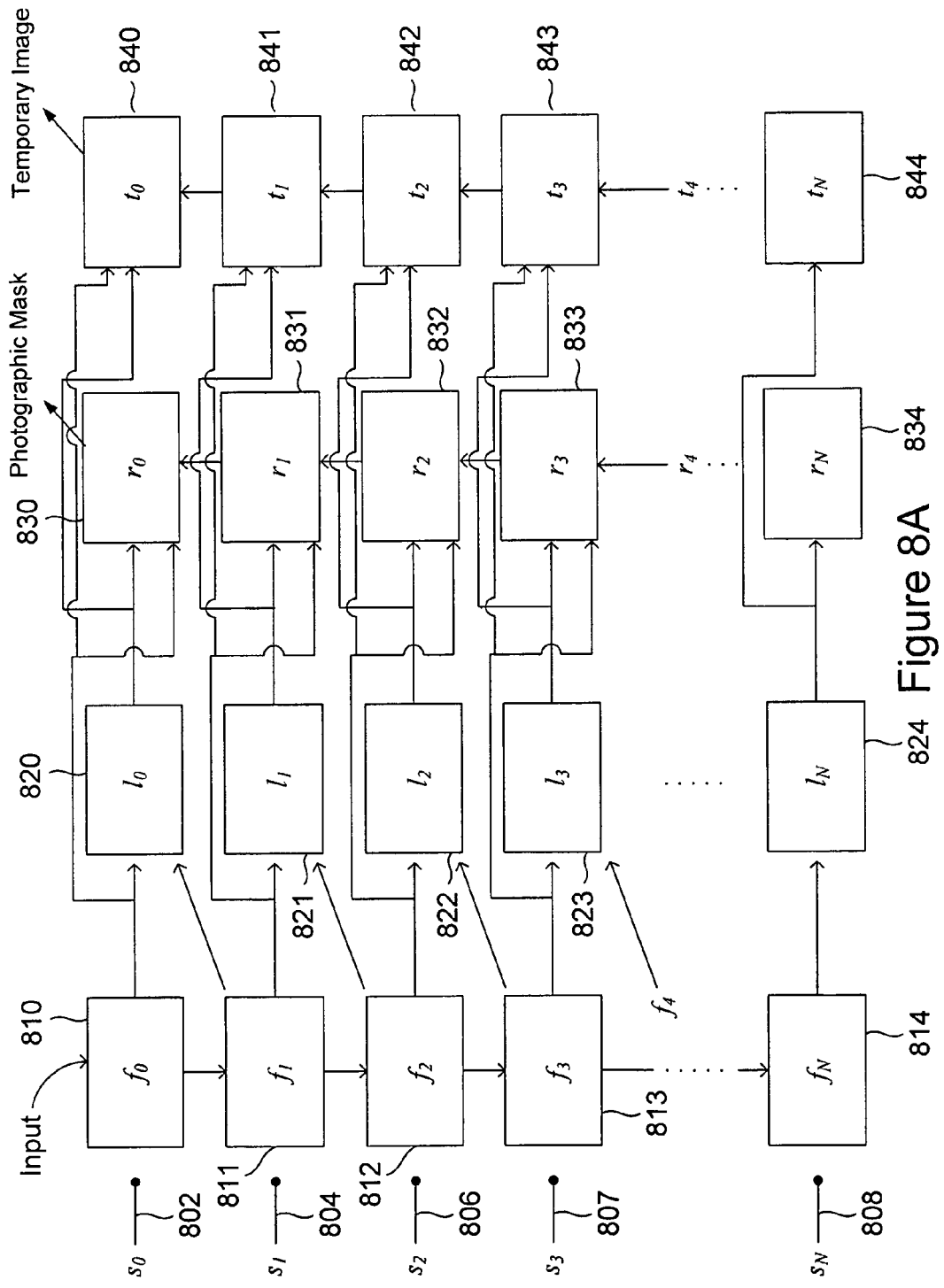
FIGS. 8A-B illustrate, at a high level, generation of the photographic mask and temporary image by the USSIP and use of the photographic mask and temporary image to generate a locally and globally contrast-enhanced, sharpened, and denoised output image.
Figure 8B:
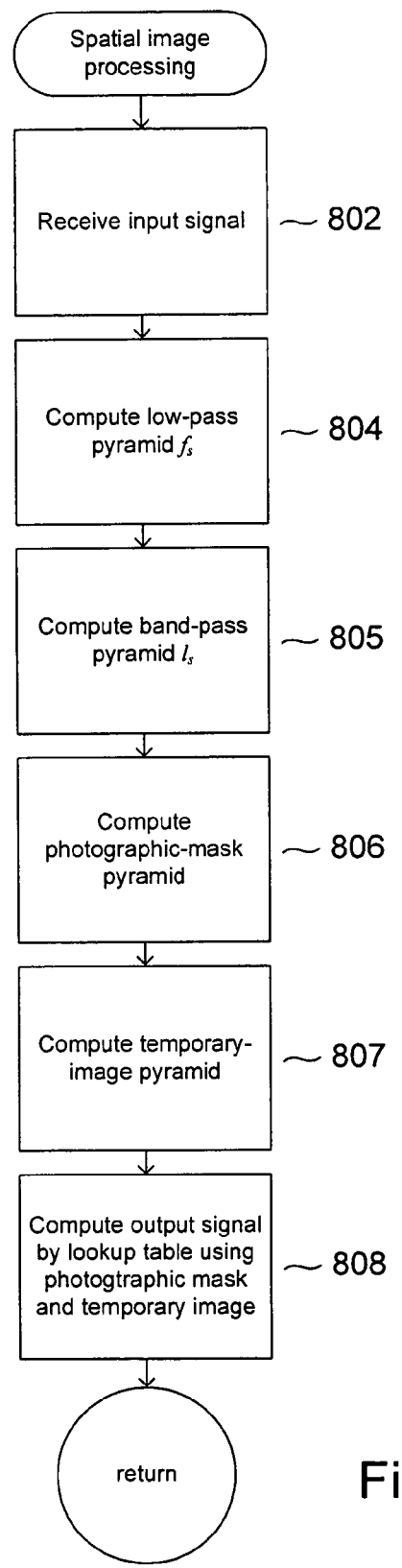
Figure 9:
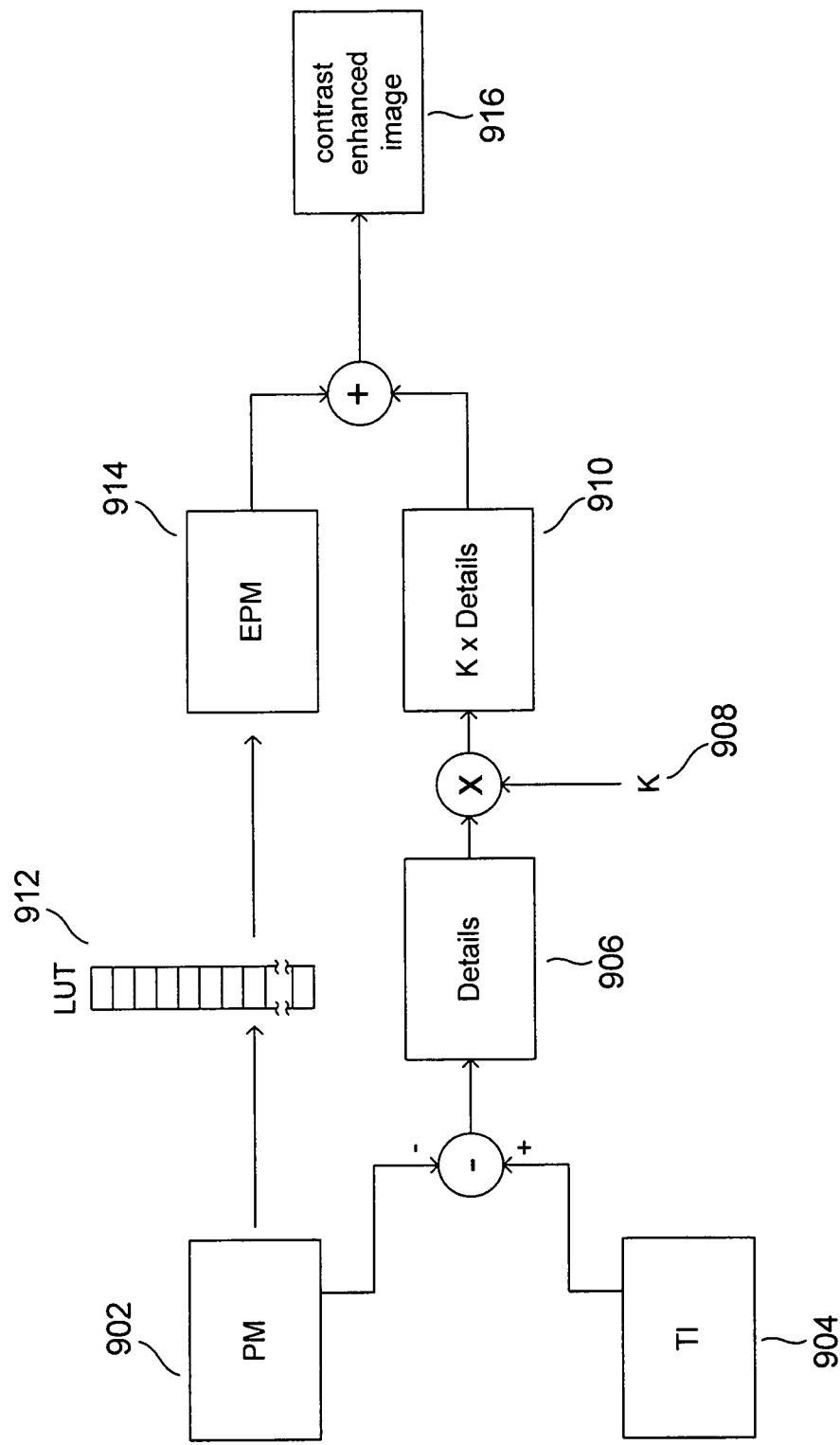
FIG. 9 illustrates a generalized, second part of comprehensive image enhancement in the USSIP.

The changes in the histogram and cumulative-distribution histogram for the hypothetical, tiny figure, discussed with reference to FIGS. 8 and 9, are relatively small in comparison with the changes that may arise in an actual image. Problems associated with the global-enhancement technique can be summarized as follows. First, a function applied to pixel values of an image may lead to non-uniform changes in relative pixel values within a region of the image. Saturation may also occur, because the grayscale or illumination range is finite, and cannot be expanded at the extreme values. A more serious problem is that, when one portion of an image, or range of grayscale values, is enhanced, or amplified, then another portion of the image, or range of grayscale values, needs to be compressed in order to avoid changing the overall brightness of the image.

Unified Scheme for Spatial Image Processing

Recently, a multi-scale approach to image processing has been developed. In this subsection, the unified scheme for spatial image processing ("USSIP") is described, as background for subsequent discussion of three embodiments of the present invention.

The USSIP is a unified approach to comprehensive image enhancement in which a number of different facets of image enhancement are carried out concurrently through a multi-scale image decomposition that produces a number of series of intermediate images and reconstruction of the intermediate images to generate a final, enhanced image for output. Two intermediate images at highest-resolution scale, used in subsequent processing, are computed by a first portion of the method that includes computation of a number of different intermediate images at each of the number of different scales. The two intermediate images include a photographic mask and a temporary image. The photographic mask is a transformation of the luminance, lightness, grayscale, or other values of the input image in which details with a contrast below a relatively high threshold are removed. The temporary image represents a transformation of the input image in which details with a contrast above a low threshold are enhanced, details with a contrast below the low threshold are removed, and details above a high threshold are preserved. The high and low threshold may vary from one scale to another. The values that the high and low thresholds are generally non-negative values that range from zero to a practically infinite, positive value. When the low threshold is equal to zero, no details are removed from the temporary image. When the high threshold is practically infinite, all details are removed from the photographic mask, and all details are enhanced in the temporary image. The temporary image includes the details that are transformed to carry out 3D boosting, sharpening, and denoising of an image. In certain USSIP implementations, once the highest-resolution-scale versions of the photographic mask and temporary image are obtained, through a computational process described below, luminance or gray-scale values of the photographic mask and temporary image can be used, pixel-by-pixel, as indices into a two-dimensional look-up table to generate output pixel values for a final, resultant, contrast-enhanced output image.

FIGS. 8A-B illustrate, at a high level, generation of the photographic mask and temporary image and use of the photographic mask and temporary image to generate a locally and globally contrast-enhanced, sharpened, and denoised output image. FIG. 8A shows the first portion of computation in the USSWP leading to computation of a photographic mask and temporary image at the highest-resolution scale, so, the original scale of the input image. In FIG. 8A, scales of various intermediate images are represented by horizontal regions of the figure, each horizontal region corresponding to a different scale. The top-level horizontal region represents the highest-resolution scale $s_0$ 802. The next-highest horizontal region represents a next-lowest resolution scale $s_1$ 804. FIG. 8A shows three additional lower-resolution scales 806-808. At each scale, four different intermediate images are generated. For example, at scale $s_0$ (802), four intermediate images $f_0$ 810, $l_0$ 820, $r_0$ 830, and $t_0$ 840 are generated. At each of N+1 scales i employed within the unified comprehensive image-enhancement method of the present invention, where N may be specified as a parameter or, alternatively, may be an implementation detail, four intermediate images $f_i$, $l_i$, $r_i$, and $t_i$ are generated. Each column of intermediate images in FIG. 8A, where each column is headed by one of the highest-resolution-scale intermediate images $f_0$ 810, $l_0$ 820, $r_0$ 830, and $t_0$ 840, represents a pyramid of intermediate images, widest at the top and decreasing in width, generally by a constant factor, such as "2," at each level to the smallest, lowest-resolution intermediate image $f_n$ 814, $l_n$ 824, $r_n$ 834, and $t_n$ 844. Intermediate images 810-814 represent the f pyramid, intermediate images 820-824 represent the l pyramid, intermediate images 830-834 represent the r pyramid, and intermediate images 840-844 represent the t pyramid.

The temporary images computed at each scale include: (1) $f_0, f_1, \ldots, f_N$, low-pass intermediate images generated by, for scales of lower resolution than the highest-resolution scale So, a robust decimation operator to be described below; (2) $l_0$, $l_1, \ldots, l_N$, band-pass intermediate images produced, at scales of greater resolution than the lowest-resolution scale, by subtraction of a bilaterally interpolated image from a corresponding low-pass image, as described below; (3) photographic-mask ("PM") intermediate images $r_0, r_1, \ldots, r_N$, photographic mask images computed using bilateral interpolation, as described below; and (4) temporary-image images ("TI") $t_0$, $t_1, \ldots, t_N$, computed using bilateral interpolation in a process described below. In certain expressions provided below, the notation $f_s$ is used to represent the collection of intermediate images in the f pyramid, $f_0, f_1, \ldots, f_N$, the notation $l_s$ is used to represent the collection of intermediate images in the l pyramid, $l_0, l_1, \ldots, l_N$, the notation $r_s$ is used to represent the collection of intermediate images in the r pyramid, $r_0$, $r_1, \ldots, r_N$, and the notation $t_s$ is used to represent the collection of intermediate images in the t pyramid, $t_0, t_1, \ldots, t_N$. The highest-resolution-scale PM and TI intermediate images, 830 and 840, respectively, in FIG. 8A are the photographic mask and temporary image used in a second phase of computation to generate a comprehensively enhanced image for output.

In the computational diagram shown in FIG. 8A, it can be seen, by observing arrows input to each intermediate image, that each intermediate image of the low-pass pyramid $f_1$, $f_2, \ldots, f_N$ is computed from a higher-resolution-scale low-pass image, with the first low-pass intermediate image $f_0$ obtained as the input signal. The successive low-pass intermediate images are computed in an order from next-to-highest-resolution scale $s_1$ to lowest-resolution scale $S_N$. The band-pass-pyramid intermediate images $l_0, l_1, \ldots, l_{N-1}$ may be computed in either top-down or an opposite order, with the lowest-resolution-scale band-pass intermediate image $l_N$ obtained as the lowest-resolution-scale low-pass intermediate image $f_N$ and higher-resolution-scale band-pass intermediate images $l_{N-1}, l_{N-2}, \ldots, l_0$ each computed from both the next-lower-resolution low-pass image and the low-pass intermediate image at the same scale. The PM intermediate images and TI intermediate images $r_0, r_1, \ldots r_N$ and $t_0$, $t_1, \ldots, t_N$ are computed from next-to-lowest-resolution-scale $s_{N-1}$ to highest-resolution scale $s_0$. Each higher-resolution-scale PM image $r_i$ is computed from $r_{i+1}$, $f_i$, and $l_i$, and each higher-resolution-scale TI image $t_i$ is computed from $t_{i+1}$, $f_i$, and $l_i$. Thus, the low-pass pyramid $f_0, f_i, \ldots, f_N$ is computed from base to apex, while the remaining pyramids are computed from apex to base. Computation of each of the different types of intermediate images $f_i$, $l_i$, $r_i$, and $t_i$ is discussed in separate subsections, below.

FIG. 8B is a high-level control-flow diagram for the USSIP. In step 802, an input signal, generally a photographic image, graphic, or video-signal frame, is received. In step 804, the low-task pyramid $f_0, f_i, \ldots, f_N$ is computed. In step 805, the band-pass pyramid $l_0, l_1, \ldots, l_N$ is computed. In step 806, the PM pyramid $r_0, r_1, r_2, \ldots, r_N$ is computed. In step 807, the TI pyramid $t_0, t_1, \ldots, t_N$ is computed. Using the highest-resolution-scale PM and TI (830 and 840 in FIG. 8A, respectively), an output signal is computed, in step 808, by using PM and TI pixel values, pixel-by-pixel, as indices of a two-dimensional look-up table to generate output-image pixel values.

The multi-scale pyramid approach discussed above has great advantages in computational efficiency. In alternative approaches, bilateral filters with very large kernels are applied to the images at a single scale in order to attempt to produce intermediate images similar to a photographic mask. However, large-kernel bilateral filter operations are extremely computationally expensive. A multi-scale approach provides results equivalent to those obtained by certain large-kernel bilateral filter operations at a much lower cost in processor cycles and computation time.

In certain currently available image-enhancement methods, each pixel of an image is passed through a one-dimensional look-up table ("1D LUT"), with the 1D LUT designed to achieve the desired effects by amplifying certain portions of an image and compressing certain other portions of the image. In other words, the LUT represents a function applied to pixel values within a range of pixel values, in certain cases multiplying differences of pixel values of the original image by values greater than 1.0, to effect detail amplification, and in other cases multiplying differences of pixel values of the original image by values less than 1.0, to effect detail compression. Implementations of the USSIP are designed to amplify all regions of an image by multiplying the differences of pixels of values of each region by a constant greater than or equal to 1.0. In this family of methods, the PM is passed through a 1D LUT, at least logically, to generate an enhanced PM which is then combined with an intermediate details image obtained by subtracting the PM from the TI. This overall method can be simplified by using a two-dimensional look-up table.

FIG. 9 illustrates a generalized, second part of comprehensive image enhancement according to the present invention. This second part of the present method begins, in FIG. 9, with the PM 902 and TI 904 obtained from the highest-resolution-scale PM intermediate image $r_0$ and the highest-resolution-scale TI intermediate image $t_0$ (830 and 840 in FIG. 8A). A details intermediate image 906 is computed by subtracting the PM 902 from the TI 904. The details are then multiplied by a constant k 908 to produce an amplified details intermediate image 910. The PM 902 is transformed through a one-dimensional LUT 912 to generate an enhanced PM 914. The enhanced PM 914 is then added to the amplified details image 910 to produce a final, contrast-enhanced image 916.

Figure 10:
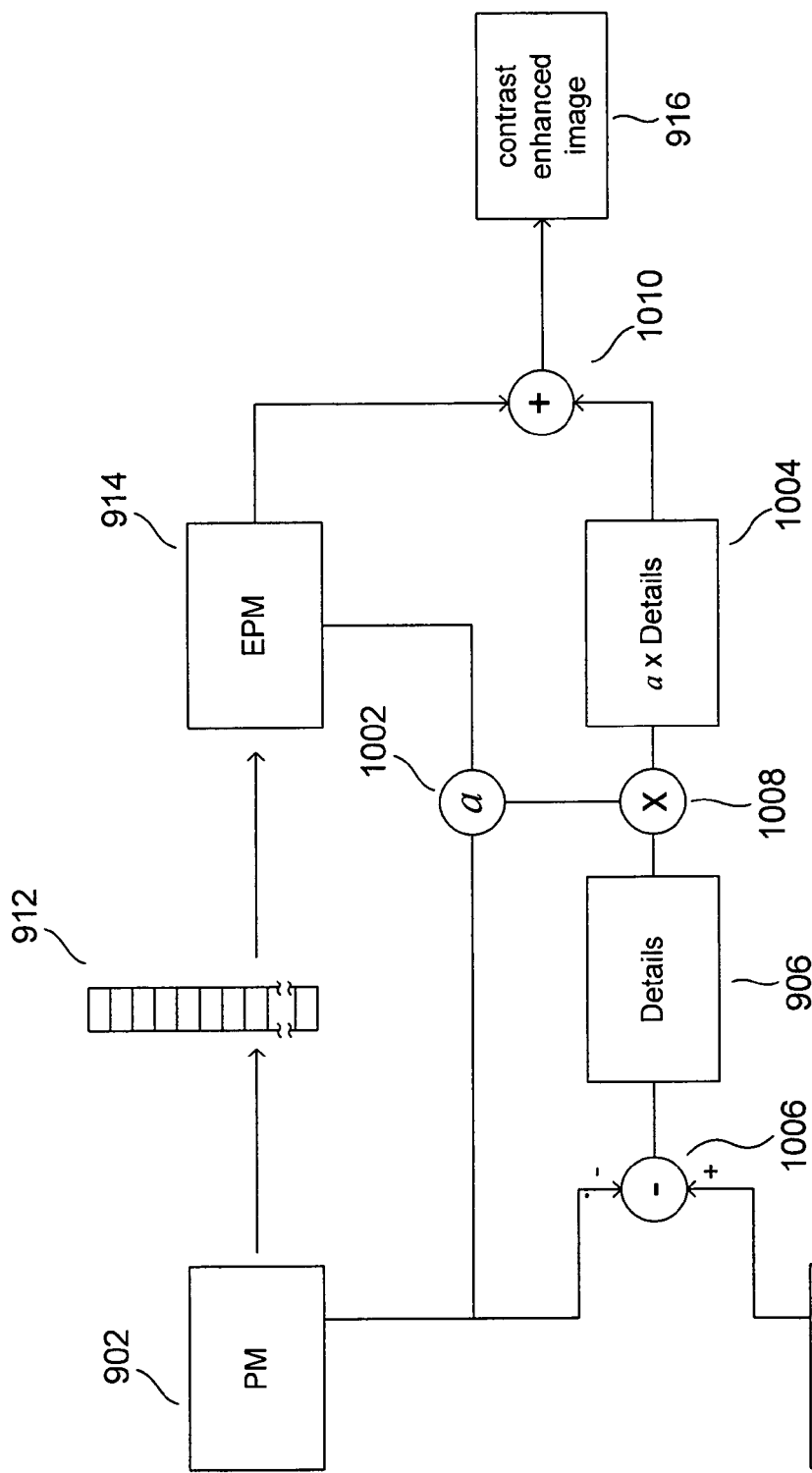
FIG. 10 illustrates a modified approach to comprehensive image enhancement that represents an alternative implementation of the USSIP.

Although FIG. 9 illustrates the general strategy for comprehensive image enhancement in the USSIP, it turns out that more effective image enhancement can be obtained by modifying the approach shown in FIG. 9. FIG. 10 illustrates a modified approach to comprehensive image enhancement in the USSIP. As in FIG. 9, the PM 902 and TI 904 are used to generate the details intermediate image 906 and the enhanced PM 914 via look-up table 912. However, rather than multiplying the details image 906 by a constant, as shown in FIG. 9, the details is transformed, pixel-by-pixel, via function a 1002 to produce a modified details temporary image 1004 in which details are amplified or compressed according to whether the region in which the details are located is amplified or compressed in the enhanced PM 914. The modified details temporary image 1004 and the enhanced PM 914 are then added together to produce the final, comprehensively contrast-enhanced image 916. The details of the computations used to produce the enhanced PM and modified details temporary image are described, in detail, in following subsections.

Figure 11:
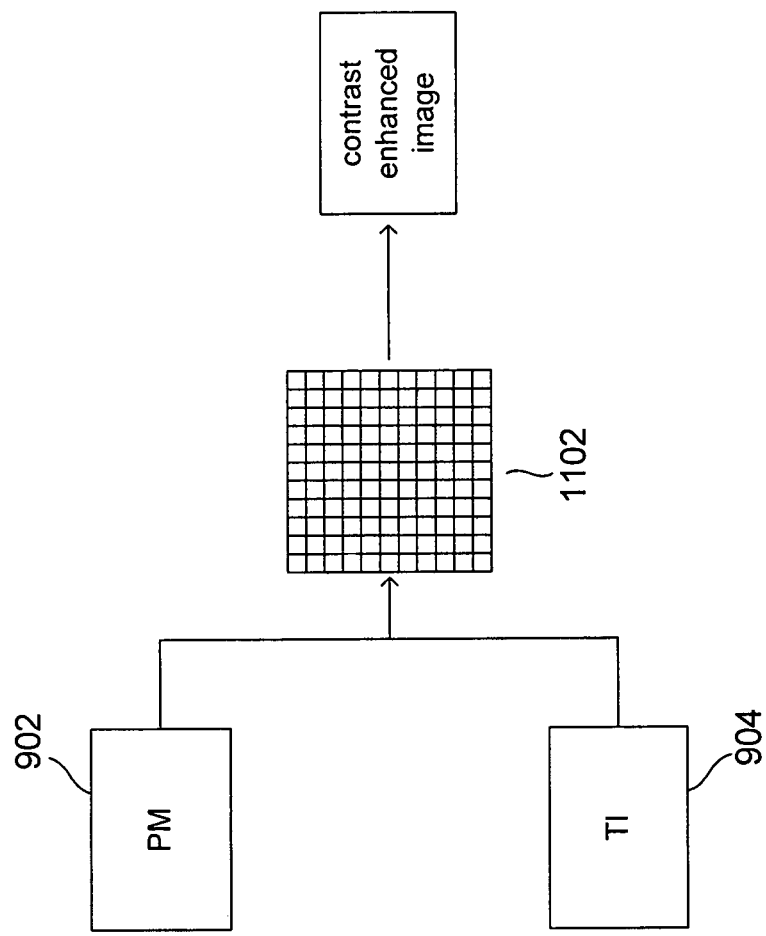
FIG. 11 shows a simplified version of the image-enhancement method shown in FIG. 10.

The comprehensive image-enhancement method shown in FIG. 10 that represents a family of USSIP implementations can be further simplified. FIG. 11 shows a simplified version of the image-enhancement method of the present invention shown in FIG. 10. In the simplified version, shown in FIG. 11, the PM and TI 902 and 904 are used, pixel-by-pixel, to generate output-image pixel values via a two-dimensional look-up table 1102. The two-dimensional look-up table 1102 tabulates pre-computed values that represent a combination of the subtraction operation 1006 in FIG. 10, the one-dimensional look-up table 912 in FIG. 10, the function a 1002 in FIG. 10, the multiplication operation 1008 in FIG. 10, and the addition operation 1010 in FIG. 10. Details of all of these operations are discussed, below, in following subsections.

Next, in the following subsections, details regarding computation of each of the different types of intermediate images shown in FIG. 8A, and the details for output-image construction using the PM and TI, are provided with reference to a number of detailed figures and mathematical equations.

The Low-Pass Pyramid

As discussed above, the low-pass pyramid comprises intermediate images $f_0, f_1, \ldots, f_N$. These intermediate low-pass images $\{f_s(x, y)\}$, $s=0, 1, \ldots, N$ are obtained from an input image $f(x, y)$ as follows:

$$f_s = \begin{cases} f, & s = 0 \\ RD\{f_{s-1}\}, & s > 0 \end{cases}$$

$RD\{.\}$ is a robust decimation operator, consisting of bilateral filtering, followed by 2:1 down sampling:

$$RD\{g\}(x; y) = \frac{\sum_{(a,b)\in k} g(2x-a, 2y-b)k(a, b)\varphi\begin{bmatrix} g(2x-a, 2y-b) - \\ g(2x, 2y) \end{bmatrix}}{\sum_{(a,b)\in k} k(a, b)\varphi[g(2x-a, 2y-b) - g(2x, 2y)]}$$

where k(.,.) is a convolution kernel with support K and φ(.) is a symmetric photometric kernel. In one USSIP variant, the convolution kernel k is a 3×3 constant averaging kernel and φ(d) returns the numeric constant 1.0 for |d|<T and otherwise returns 0, where T is a relatively high threshold, such as 50 for a grayscale-pixel-value-range of [0-255]. The number of scales employed in USSIP implementations N is a parameter, and may be set to a value as follows: N=⌈log$_2$ [min (w, h)]⌉+offset where w and h are the width and height of the input image f in pixels, and offset is a constant, such as the integer value "3."

Figure 12:
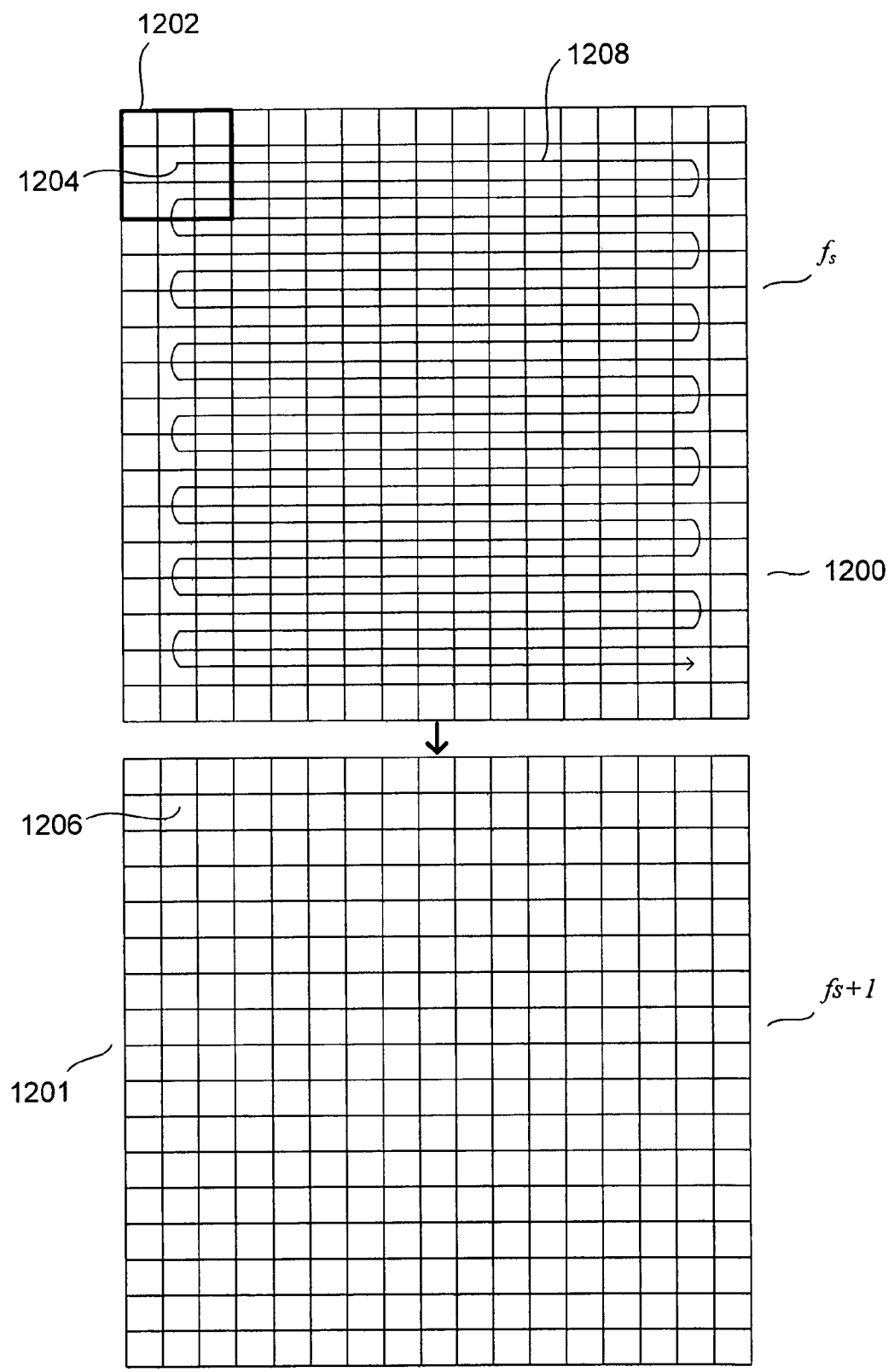
FIGS. 12-15 illustrate computation of intermediate low-pass images of the low-pass pyramid $f_i$.

FIGS. 12-15 illustrate computation of intermediate low-pass image of the low-pass pyramid $f_i$. In FIGS. 12-15, bilateral filtering is separated from downscaling, in order to illustrate the two-fold effect of the above describe robust decimation operator. In fact, in a preferred USSIP technique, discussed below, and described in the above-provided equations for the robust-decimation operator, both bilateral filtering and downscaling are accomplished in a single operation, As shown in FIG. 12, the bilateral filtering portion of the computation of an intermediate low-pass image involves a windowing operation, or filter operation, similar to a convolution operation. However, in a filter operation, small neighborhoods, or windows about each pixel, such as window 1202 about pixel 1204, are considered, pixel-by-pixel, with the values of the pixels within the window, or within a neighborhood about a central pixel, used to determine the corresponding value of a corresponding, lower-resolution-scale low-pass intermediate-image pixel 1206. The window is moved, with each operation, to be centered on a next pixel, with the next pixel chosen according to the path 1208 shown in FIG. 12, or another such traversal route, in which each pixel of the intermediate image $f_s$ to be transformed is considered within the context of the neighborhood about the pixel. Each pixel-and-neighborhood operation on $f_s$ generates a corresponding pixel value for $f_{s+1}$. FIG. 12 illustrates generation of the low-pass intermediate image $f_{s+1}$ from the low-pass intermediate image $f_s$. As can be seen in the above-provided mathematical description for generation of low-pass intermediate images, the highest-resolution-scale low-pass intermediate image is essentially identical to the input image. It is only for the lower-resolution-scale low-pass intermediate images that the technique shown in FIG. 12 is applied.

Figure 13:
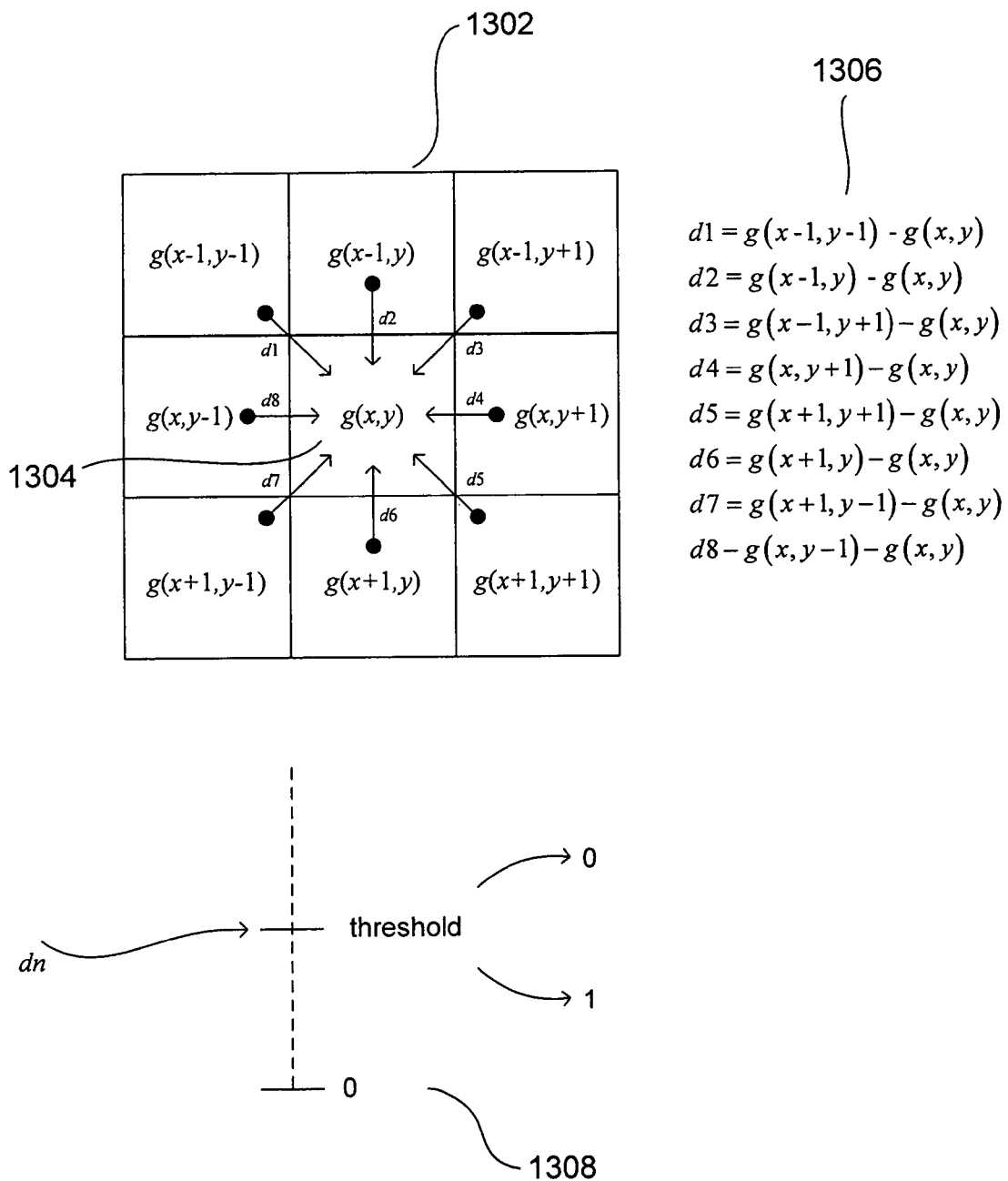

FIG. 13 shows the window, or filter, operation described in the above-provided mathematical expression. As mentioned above, a 3×3 window 1302 is employed in one USSIP technique to represent eight nearest neighbor pixels about a central pixel 1304. In FIG. 13, the pixel values for the pixels are represented using a "g( )" notation, where g(x,y) represents the pixel value for the central pixel 1304, with the numeric value "1" added to, or subtracted from, x, y, or both x and y, are used to represent the values of the neighboring pixels, as also shown in FIG. 13. First, as indicated by the column of expressions 1306 in FIG. 13, differences d1, d2, . . . , d8 are computed by considering each possible pair of pixels comprising a neighboring pixel and the central pixel. The differences dn, where n=8, are obtained by subtracting the pixel value of the central pixel within the window 1304 from the pixel value of each of the neighboring pixels, in turn. Then, as shown in the lower portion of FIG. 13 (1308), the absolute values of the dn values are thresholded to return either the value "0," when the absolute value of the difference dn is greater than a threshold value T, or the value "1," when the absolute value of the difference dn is less than the threshold T.

Figure 14:
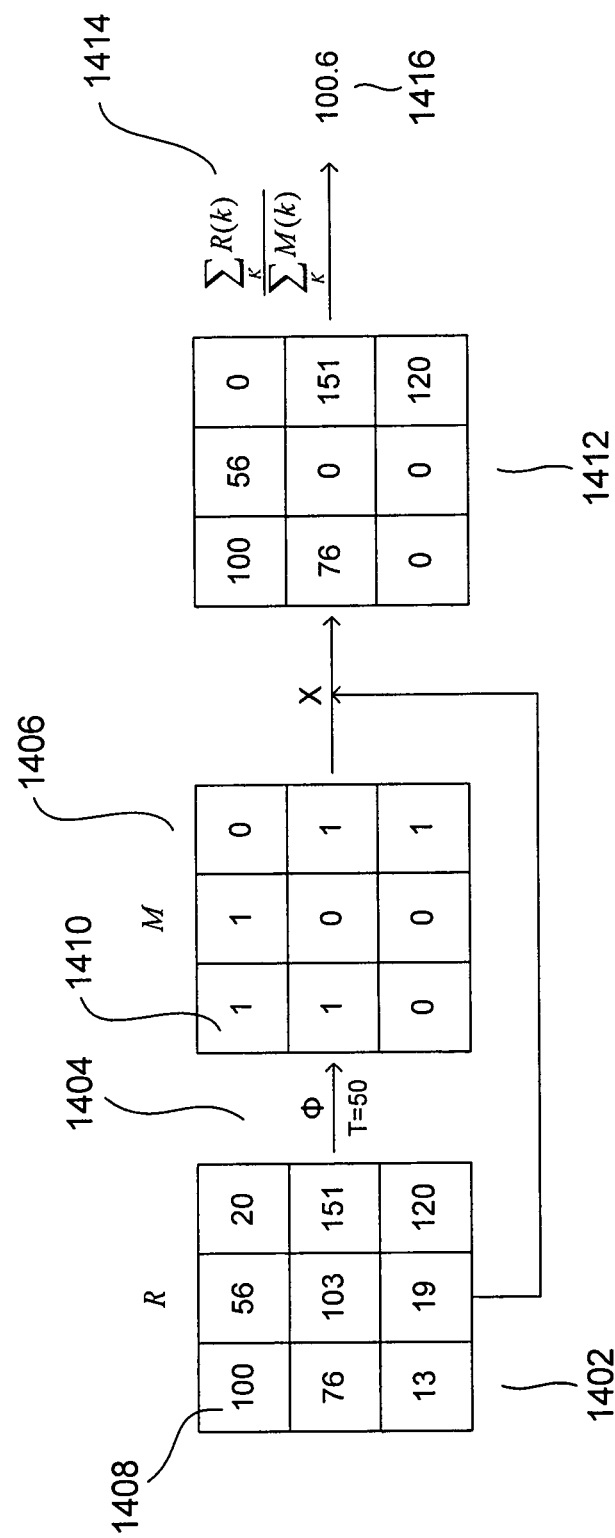

The thresholded dn values, where the thresholding function is represented by the function $\phi(.)$ in the above-provided mathematical expression, then form a mask that is convolved with the window values of the $f_s$ image to produce a resultant value for the corresponding pixel of $f_{s+1}$ prior to downscaling. FIG. 14 illustrates generation of the mask and convolution of the mask with the neighborhood to produce the pixel value of $f_{s+1}$ corresponding to the pixel of $f_s$ at the center of the window. In FIG. 14, the window or region of $f_s$, R, that includes, as the central pixel, a currently considered pixel of $f_s$ 1402, is thresholded by the function $\phi(.)$ where T=50 1404 to produce the corresponding binary mask 1406. For example, the pixel value 100 (1408) is greater than T=50, and therefore the corresponding binary-mask value is "1" (1410). The binary mask is then convolved with, or multiplies, the values of the region R 1402 to produce the convolved-region result 1412. In this result region 1412, only those pixel values within the region R of $f_s$ with absolute values greater than or equal to 50 remain. The pixel values in the region R with absolute values less than T are replaced, and the resultant region 1412, with the values "0." Then, the sum of the values in the resultant region 1412 is computed, and divided by the number of non-zero pixel values within the region, as indicated by expression 1414 in FIG. 14, to produce a final resultant pixel value 1416 that is the value for the corresponding pixel $f_{s+1}$ prior to downscaling.

Figure 15:
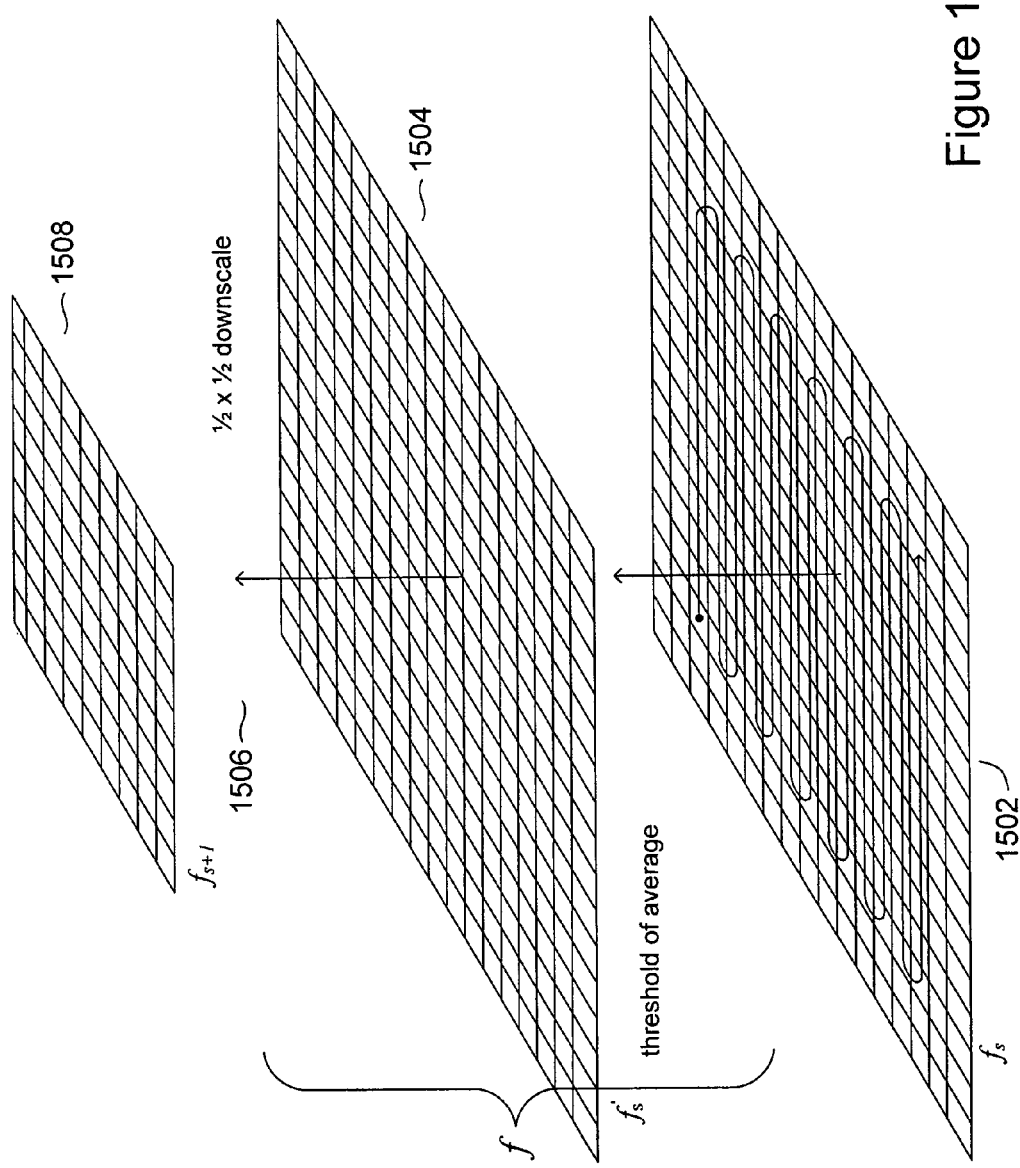

When the entire low-pass intermediate image $f_s$ (1200 in FIG. 12) is traversed, by the windowing or filtering operation described with reference to FIGS. 13 and 14, above, the resulting temporary $f_{s+1}$ intermediate image is downscaled by a ½×½ downscale operation. FIG. 15 thus shows both parts of the bilateral filtering operation represented by the above-provided mathematical expressions. As shown in FIG. 15, the low-pass intermediate image $f_s$ 1502 is first filtered, as discussed with reference to FIGS. 13-14, to produce a thresholded and averaged intermediate image $f_s'$ 1504 which is then downscaled by a ½×½ downscale operation 1506 to produce the next lower-resolution-scale low-pass intermediate image $f_{s+1}$ 1508. Thus, FIGS. 12-15 graphically represent the mathematical operation described above for computing all but the highest-resolution-scale low-pass intermediate image. The result of this operation is to create a series of low-pass intermediate images in which high-contrast features have been removed.

Although the method described in FIGS. 12-15 produce the desired bilaterally filtered and downscaled low-pass intermediate image, both the bilateral filter operation and the downscaling operation are performed in a single step by the robust decimation operator described in the above provided equations. In essence, because of the factor "2" in the above equations for the robust-decimation filter, the windowing operation is actually carried out on every other pixel in the intermediate image $f_s$ in both the horizontal and vertical directions. Thus, only a number of $f_{s+1}$ pixel values equal to approximately ¼ of the pixel values in $f_s$ are generated by application of the robust decimation operator described by the above-provided equations to the intermediate image $f_s$.

The band-pass pyramid $\{l_s(x,y)\}$, s=0, 1, . . . , N, is computed from the low-pass pyramid $f_s$, described in the previous subsection, as follows:

$$l_s = \begin{cases} f_s - RI\{f_{s+1}, f_s\}, & s < N \\ f_N, & s = N. \end{cases}$$

where $RI\{.,.\}$ is a novel bilateral 1:2 interpolator, which takes its weights from the higher scale image, as follows:

$$RI\{f_{s+1}, f_s\}(x, y) = \begin{cases} f_{s+1}\left(\frac{x}{2}, \frac{y}{2}\right) & x \text{ is even, } y \text{ is even} \\ \frac{g_{NW}w_N + g_Sw_S}{w_N + w_S} & x \text{ is odd, } y \text{ is even} \\ \frac{g_Ew_E + g_Ww_W}{w_E + w_W} & x \text{ is even, } y \text{ is odd} \\ \frac{g_{NE}w_{NE} + g_{NW}w_{NW}}{w_{NE} + w_{NW} + w_{SE} + w_{SW}} & x \text{ is odd, } y \text{ is odd} \end{cases}$$

where:

$$g_N = f_{s+1}\left(\frac{x-1}{2}, \frac{y}{2}\right),$$

$$g_S = f_{s+1}\left(\frac{x+1}{2}, \frac{y}{2}\right),$$

$$g_W = f_{s+1}\left(\frac{x}{2}, \frac{y-1}{2}\right),$$

$$g_E = f_{s+1}\left(\frac{x}{2}, \frac{y+1}{2}\right),$$

$$g_{NW} = f_{s+1}\left(\frac{x-1}{2}, \frac{y-1}{2}\right),$$

$$g_{NE} = f_{s+1}\left(\frac{x-1}{2}, \frac{y+1}{2}\right),$$

$$g_{SW} = f_{s+1}\left(\frac{x+1}{2}, \frac{y-1}{2}\right),$$

$$g_{SE} = f_{s+1}\left(\frac{x+1}{2}, \frac{y+1}{2}\right),$$

$$w_N = \varphi[f_s(x-1, y) - f_s(x, y)],$$

$$w_s = \varphi[f_s(x+1, y) - f_s(x, y)],$$

$$w_W = \varphi[f_s(x, -1y) - f_s(x, y)],$$

$$w_E = \varphi[f_s(x, y+1) - f_s(x, y)],$$

$$w_{NW} = \varphi[f(_sx-1, y) - f_s(x, y)],$$

$$w_{NE} = \varphi[f_s(x-1, y+1) - f_s(x, y)],$$

$$w_{SW} = \varphi[f_s(x+1, y-1) - f_s(x, y)],$$

$$w_{SE} = \varphi[f_s(x+1, y+1) - f_s(x, y)].$$

Note that, in the above expressions for RI, certain of the denominators, such as the denominator WE+WW in the expression for the x-is-odd, y-is-even case. However, when the denominators are 0, the numerators are also 0, and the value of the ratio is considered to be 0, rather than an undefined value resulting from a 0-valued denominator.

Figure 16A:
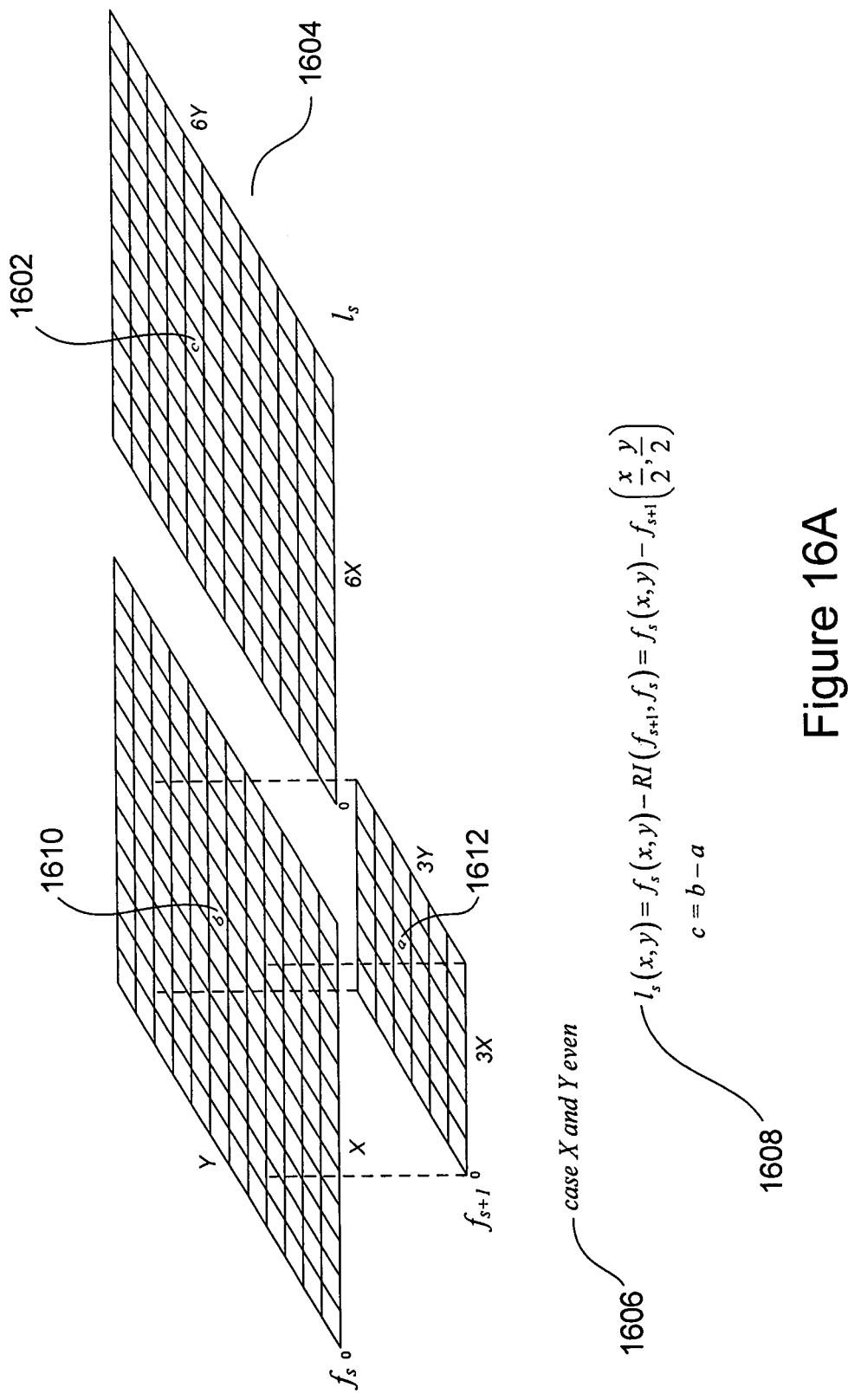
FIGS. 16A-D illustrate computation of individual pixels of a band-pass intermediate image $l_s$ from neighboring pixels in the low-pass intermediate images $f_s$ and $f_{s+i}$.
Figure 16B:
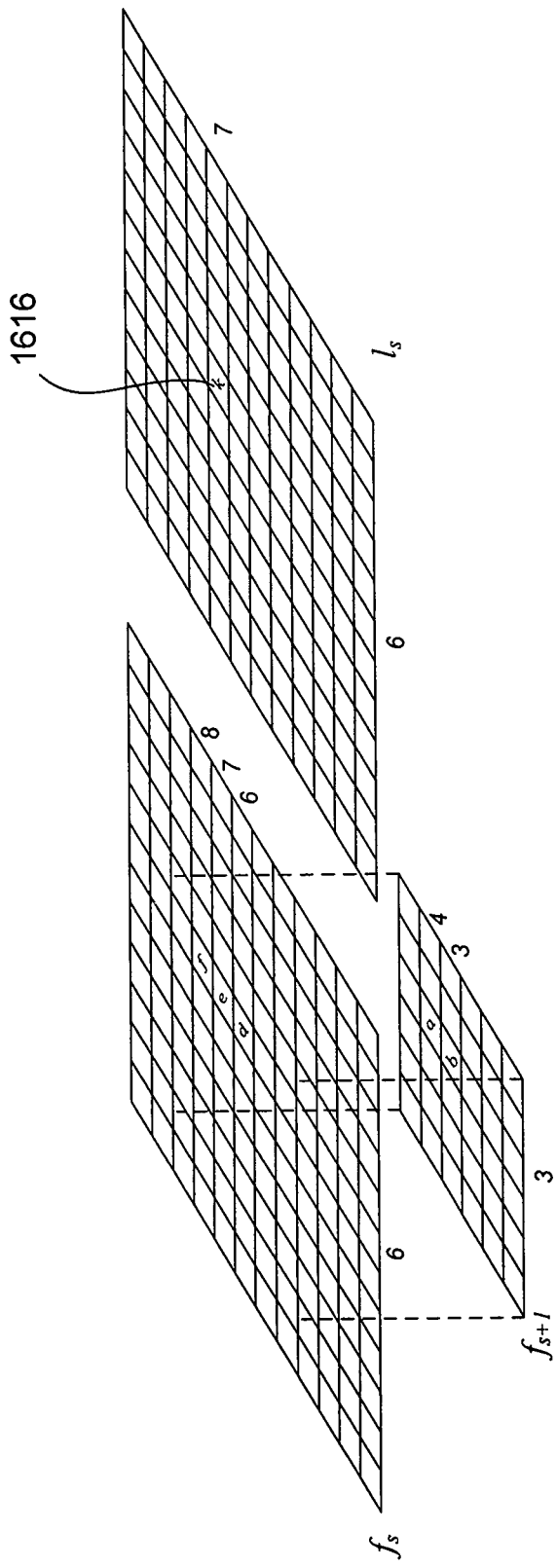
Figure 16C:
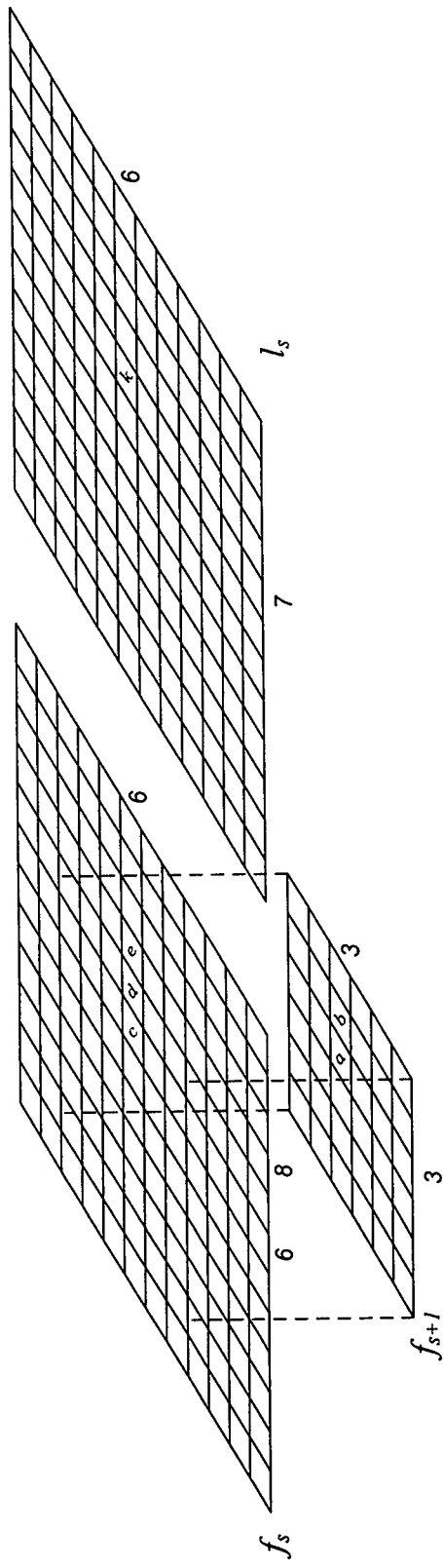
Figure 16D:
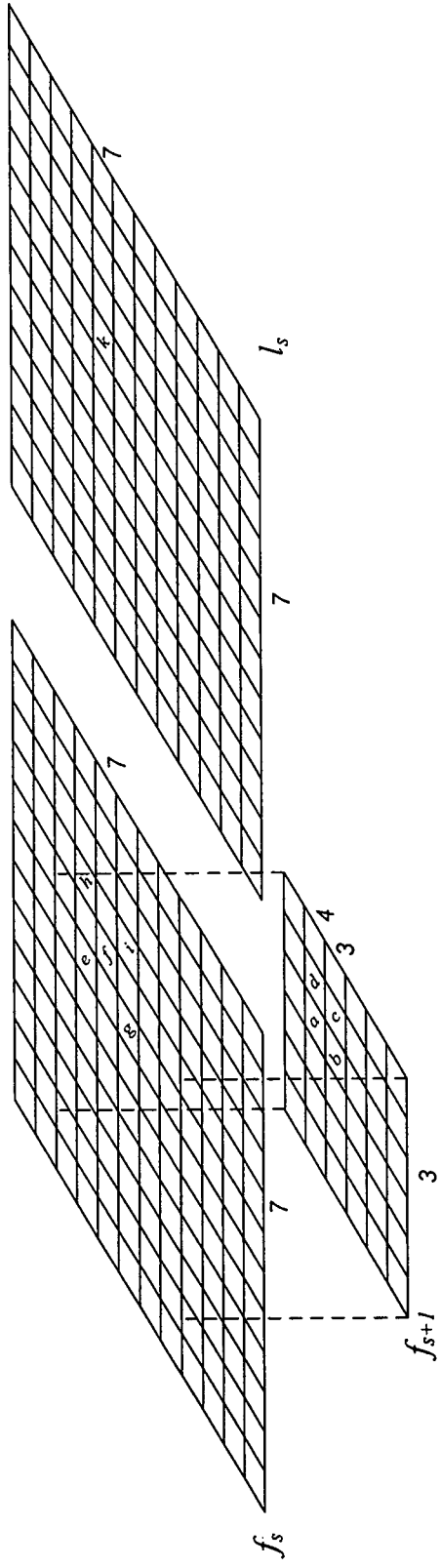

FIGS. 16A-D illustrate computation of individual pixels of a band-pass intermediate image $l_s$ from neighboring pixels in the low-pass intermediate images $f_s$ and $f_{s+1}$. Neighboring pixels in a lower-resolution-scale image are obtained by downscaling the coordinates of the corresponding pixel of the higher-resolution scale image, as will be shown, by example, in the discussion of FIGS. 16A-D. FIG. 16A corresponds to the first of four different equations for the bilateral 1:2 interpolator RI, discussed above. FIG. 16B illustrates the second of the four equations for the bilateral 1:2 interpolator RI, FIG. 16C illustrates the third of the four equations for the bilateral 1:2 interpolator RI, and FIG. 16D illustrates the fourth of the four equations for the bilateral 1:2 interpolator RI.

FIG. 16A illustrates computation of the pixel value for a pixel 1602 in $l_s$ 1604 when the coordinates of the pixel in $l_s$ are both even 1606. In this case, the expression for $l_s(x,y)$ 1608 is obtained from the above-provided mathematical expression as:

$$l_s(x, y) = f_s(x, y) - RI(f_{s+1}, f_s) = f_s(x, y) - f_{s+1}\left(\frac{x}{2}, \frac{y}{2}\right)$$

As can be seen in FIG. 16A, the pixel value of $f_s(x,y)$ is b 1610 and the pixel value for $$f_{s+1}\left(\frac{x}{2}, \frac{y}{2}\right)$$

is a 1612. Thus, substituting these pixel values into the above expression, the pixel value for pixel 1602 in $l_s$ can be computed as:

$$c = b - a$$

FIG. 16B illustrates computation of the value of a pixel in a band-pass intermediate image $l_s$ 1616 in the case that the x coordinate is even and the y coordinate is odd. From the above mathematical expressions, the expression for the value of the pixel $l_s(xy)$, k in FIG. 16B, is given by:

$$k = l_s(x, y)$$
$$= f_s - RI(f_{s+1}, f_s)$$
$$= f_s - \frac{g_E w_E + g_W W_w}{W_E + W_W}$$
$$= \frac{a((f-e)<T) + b((d-e)<T)}{((f-e)<T) + ((d-e)<T)}$$

where expressions of the form (a−b)<c are Boolean-valued relational expressions, having the value 0 when a−b≧T and having the value 1 when a−b<T. FIG. 16C shows, using similar illustration conventions, computation of the pixel value of a pixel in $l_s$, $l_s(x,y)$, when x is odd and y is even. Finally, FIG. 16D shows, using similar illustration conventions as used in FIG. 16A-C, computation of a pixel value in $l_s$, $l_s(x,y)$ when both x and y are odd.

Thus, computation of a band-pass intermediate image is a pixel-by-pixel operation that uses corresponding pixels, and pixels neighboring those corresponding pixels, in $f_s$ and $f_{s+1}$. The band-pass intermediate images retain medium-contrast details, with high-contrast details and low-contrast details removed.

PM Intermediate Image Computation

The intermediate images $r_s$ of the PM intermediate-image pyramid are computed as follows:

$$r_s = \begin{cases} l_s, & s = N \\ RI\{r_{s+1}, f_s\} + l_s[1 - \varphi(l_s)], & s < N \end{cases}$$

where the term $l_s[1-\phi(l_s)]$ returns $l_s$, if the absolute value of $l_s$ is larger than T, and 0 otherwise.

Figure 17:
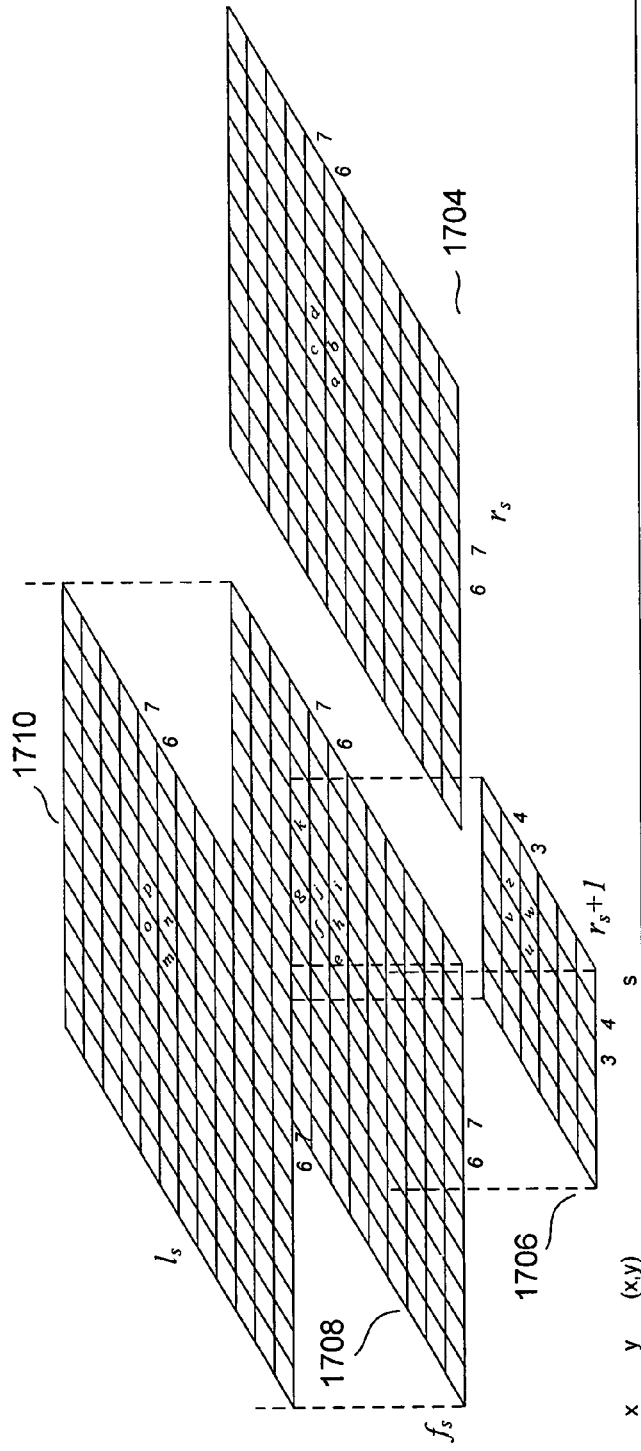
FIG. 17 illustrates, using similar illustrations as used in FIGS. 16A-D, computation of pixels in $r_s$ for four different coordinate-parity cases.

FIG. 17 illustrates, using similar illustrations as used in FIGS. 16A-D), computation of pixels in $r_s$ for four different coordinate-parity cases. Each coordinate-parity case represents one choice of the coordinates x and y being either odd or even. The table 1702 in the lower portion of FIG. 17 illustrates mathematical expressions for each of the four different coordinate-parity cases, derived from the above generalized mathematical expression for computing $r_s$. As discussed above, the PM intermediate image $r_s$ 1704 is computed based on the next-lower-scale PM intermediate image $r_{s+1}$ 1706, the low-pass intermediate image $f_s$ 1708, and the band-pass intermediate image $l_s$ 1710. The PM intermediate images have all low and mid-contrast details removed, leaving a high-resolution photographic mask in the highest-resolution-scale PM intermediate image $r_0$.

Computation of the TI Intermediate Images

Computation of the TI intermediate images $t_s$ is a pixel-by-pixel operation involving the next-lowest-scale TI intermediate image $t_{s+1}$, the low-pass intermediate image $f_s$, and the band-pass intermediate image $l_s$, expressed as follows:

$$t_s = \begin{cases} l_s, & s = N \\ RI\{t_{s+1}, f_s\} + l_s[1 - \varphi(l_s)], & s < N \end{cases}$$

where ψ is a function defined as follows:

when $|l_s(x,y)|>T$, $\psi[l_s(x,y)]=l_s(x,y)$, when $|l_s(x,y)|<T_N$, where $T_N$ is a scale-dependent some noise threshold, $\psi[l_s(x,y)]=c_N l_s(x,y)$, where $c_N<1$.

when $T_N<|l_s(x,y)|\leq T$, $\psi[l(x,y)]=\min\{c_s(l_s(x,y)-TN)+c_N T_N, T\}$, where $c_s \geq 1$.

Figure 18:
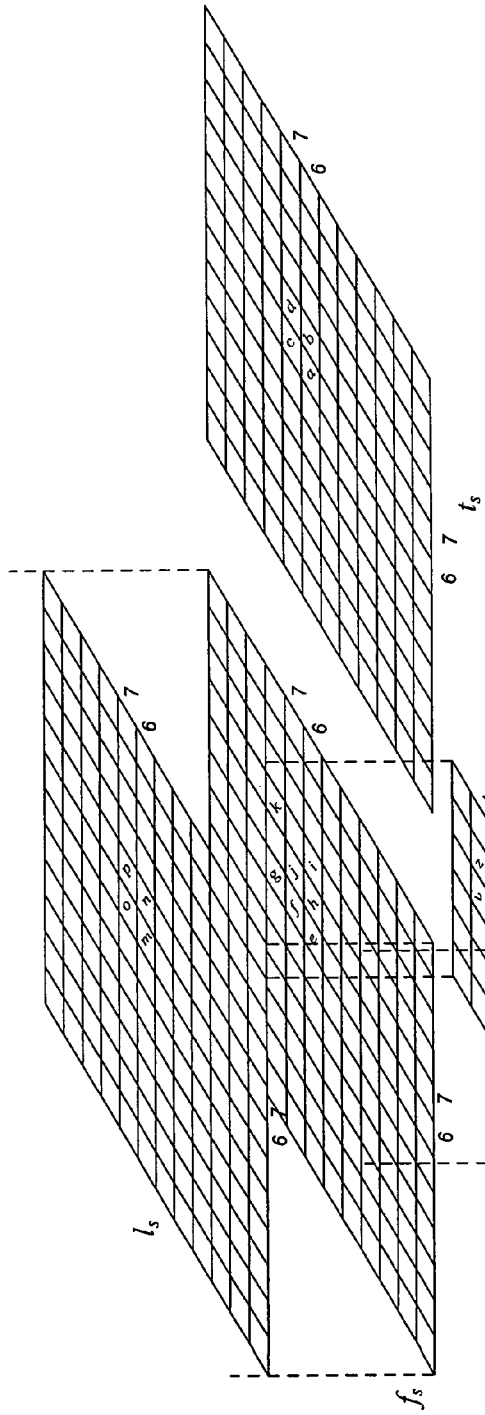
FIG. 18 illustrates, using similar illustration conventions to those used in FIGS. 16A-D and FIG. 17, computation of pixels in $t_s$ for each of the coordinate-parity cases.

FIG. 18 illustrates, using illustration conventions similar to those used in FIGS. 16A-D and FIG. 17, computation of pixels in $t_s$ for each of the coordinate-parity cases. Note that the function ψ depends on the threshold values $T_N$ and constants $c_N$ and $c_s$, and thus, in FIG. 18, symbolic values returned by ψ are not provided, with values returned by ψ simply indicated by functional notation. The TI intermediate images retain high-contrast details, include enhanced mid-contrast details, and include compressed or reduced low-contrast details. In other words, strong or high-contrast edges are not over-sharpened, important details are enhanced, and noise is reduced. In general, $T_N$ is set to a value greater than 0 only for the highest-resolution scales. $C_N$ is, in one implementation, set to 0.5. The threshold $T_N$ is determined, based on an estimate of the noise within an image, by any of various noise-estimation techniques. In alternative implementations, $c_N$ may consist of two multiplicative terms, one constant for all scales, and the other increasing for the highest-resolution scales. The first of the multiplicative terms accounts for 3D boosting, and the latter of the multiplicative terms provides for sharpening.

Computation of Output Image Based on PM and TI

Returning to FIG. 10, details of the computation of the output contrast-enhanced image are next provided. Each pixel of the output image, o(x,y) is obtained from the corresponding pixels of the temporary image t(x,y) and the photographic mask m(x,y) by:

$$o(x, y) = L[m(x, y)] + d(x, y)a(x, y)$$

where $$d(x, y) = t(x, y) - m(x, y), \text{ and}$$

$$a(x, y) = \begin{cases} L[m(x, y)]/m(x, y), & L[m(x, y)] \geq m(x, y) \\ (255 - L[m(x, y)])/(255 - m(x, y)), & \text{otherwise.} \end{cases}$$

Thus, if the currently considered pixel is in a region that is brightened by a multiplicative factor greater than 1, from $a_1$ to $a_2 > a_1$, then the function a returns the value $a_2/a_1$. However, when the region is being darkened, from $a_1$ to $a_2$ where $a_2 < a_1$, then the function a returns $(255-a_2)/(255-a_1)$ which is equivalent to inverting the input image, multiplying the particular region by a constant larger than 1, and then re-inverting the input image. These computations, represented by the above expressions, can be pre-computed for all t and m values, and incorporated into the two-dimensional look-up table 1102 in FIG. 11 as follows:

$$L_2(t,m)=L(m)+(t-m)a$$

for all t and m ranging from 0 to 255, where a is equal to L(m)/m if $L(m) \geq m$, or $(255-L(m))/(255-m)$ otherwise.

With the two-dimensional look-up table L2 precdomputed, the output image can be generated by a lookup operation, as shown in FIG. 11:

$$o(x,y)=L_2[t(x,y),m(x,y)]$$

One advantage of using the 2D LUT is that one may ensure that no saturation occurs at grayscale or luminance endpoints, such 0 and 255 for a 256-value grayscale or luminance range, by rounding the curve towards (0,0) or (255,255) as |t-m| increases.

The one-dimensional look-up table L that appears in the above expressions, and that is incorporated in the two-dimensional look-up table $L_2$, can have many different forms and values. In one USSIP technique, the one-dimensional look-up table L simultaneously performs three tasks: (1) image histogram stretching; (2) gamma correction for brightening or darkening the image, as appropriate; and (3) shadow lighting and highlight detailing. This one-dimensional look-up table is computed from a histogram and normalized cumulative histogram of the grayscale values of black-and-white images or the luminance channel of color images. Lookup tables are essentially discrete representations of arbitrary functions applied to pixel values, and many different functions can be represented by a lookup table to accomplish many different purposes.

Figure 19:
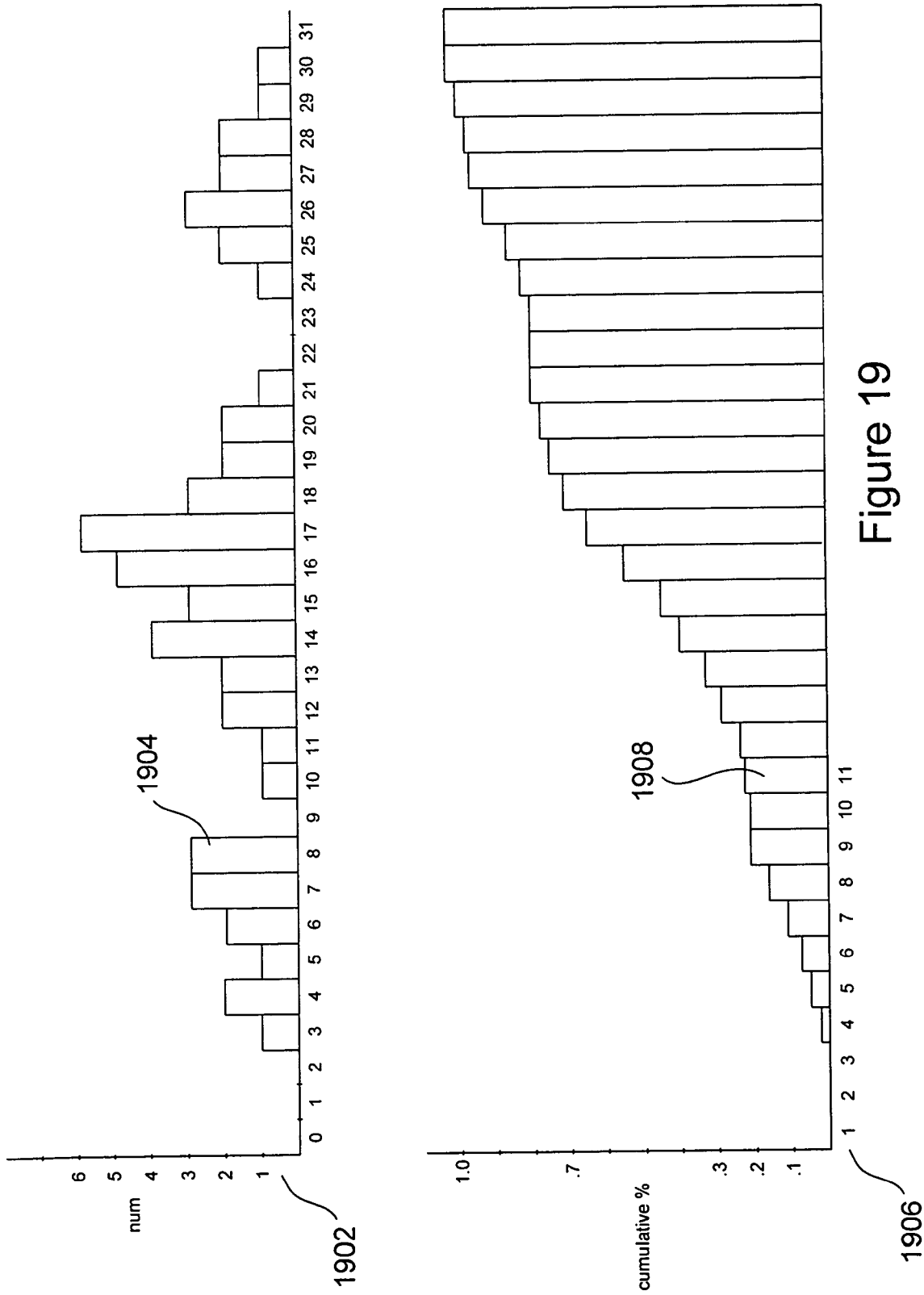
FIG. 19 shows an example histogram and cumulative histogram.

FIG. 19 shows an example histogram and cumulative histogram. The example histogram 1902 shows the number of pixels within an image having each of the possible luminance or grayscale values. In FIG. 19, the histogram and cumulative histogram are based on only 32 possible grayscale or luminance-channel values, but in many systems, the number of possible values is at least 256. Thus, in the histogram 1902 shown in FIG. 19, the bar 1904 indicates that there are three pixels within the image having grayscale value or luminance-channel value 8. The histogram can be expressed as:

$$h(x)$$

where x is grayscale or luminance value and h(x) determines the number of pixels in an image having the grayscale or luminance-channel value x.

A normalized cumulative histogram $\bar{h}(x)$ 1906 corresponding to the histogram 1902 is provided in the lower portion of FIG. 19. In a normalized cumulative histogram, each column represents the fraction of pixels within an image having grayscale or luminance values equal to or less than a particular x-axis value. For example, in the normalized cumulative histogram 1906 in FIG. 19, corresponding to histogram 1902 in FIG. 19, the vertical bar 1908 indicates that 25 percent of the pixels in the image have grayscale or luminance-channel values equal to, or less than, 11. As can be seen in the normalized cumulative histogram shown in FIG. 19, the normalized cumulative histogram function $\bar{h}(x)$ is a non-decreasing function ranging from 0.0 to 1.0. The normalized cumulative histogram can be expressed as:

$$\bar{h}(x) = \frac{\sum_{y=0}^{x} h(y)}{\sum_{y=0}^{255} h(y)}$$

Figure 20:
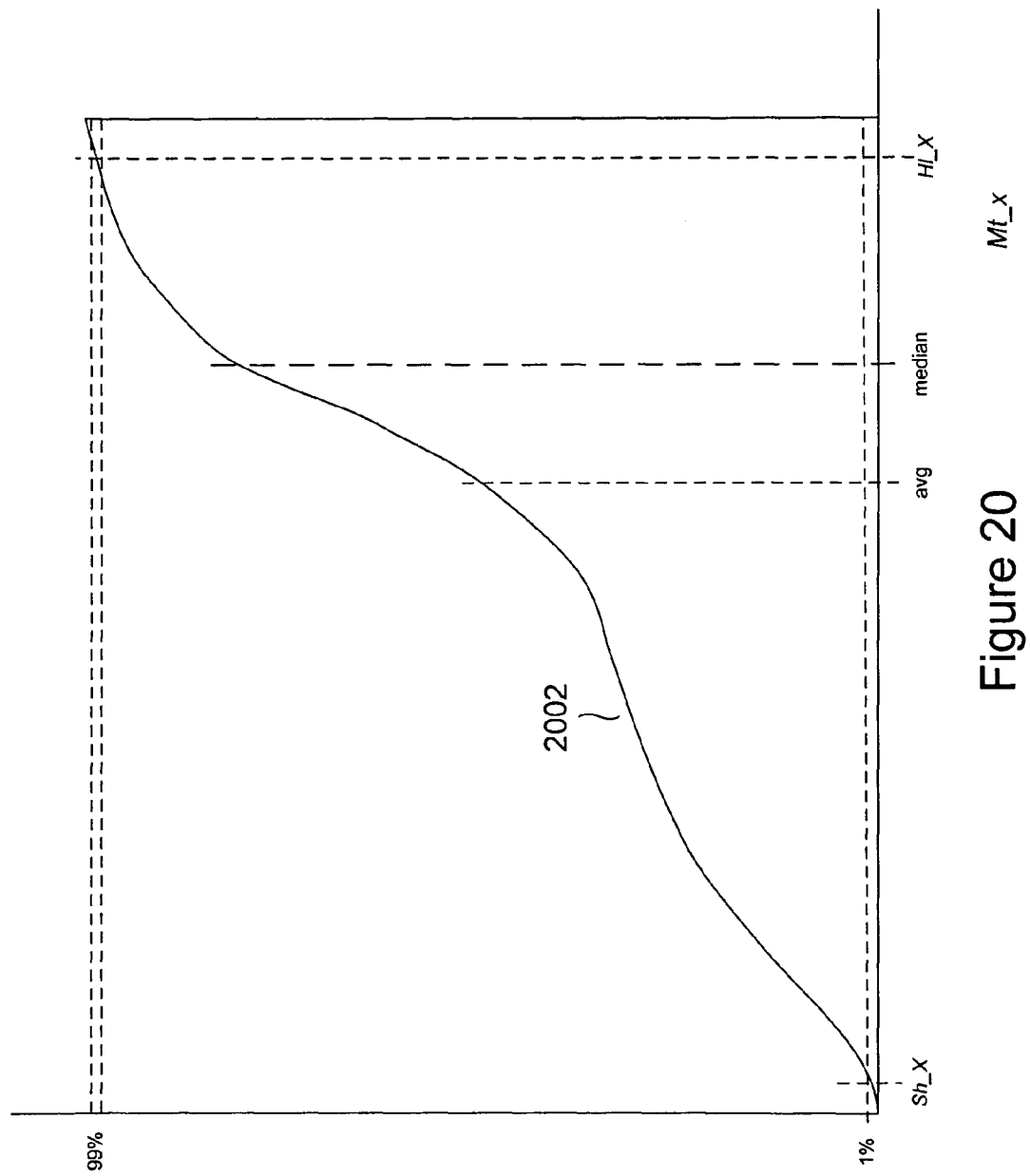
FIG. 20 shows a hypothetical normalized cumulative histogram for an example image.

FIG. 20 shows a hypothetical normalized cumulative histogram for an example image. The normalized cumulative histogram function $\bar{h}(x)$ 2002 is displayed as a somewhat bimodal curve. Three values Sh_X, Mt_X, and Hl_X are computed from the normalized cumulative histogram as indicated in FIG. 20. Sh_X is the grayscale or luminance-channel value X for which $\bar{h}(x)$ returns 0.01. Hl_X is the X value for which $\bar{h}(x)$ returns 0.99. Mt_X can be defined either as the average value or median value of the grayscale values or luminance-channel values of the image. For example, the median of the luminance-channel values is a value X such that $\bar{h}(x) \leq 0.5$ and $\bar{h}(x+1) > 0.5$. The value Sh_X is referred to as the "input shadows," the value Hl_X is referred to as the "input highlights," and the value Mt_X is referred to as the "input mid-tones." Corresponding values Sh_Y, referred to as "output shadows," Hl_Y, referred to as "output highlights," and Mt_Y, referred to as "output mid-tones," are computed, in one USSIP technique as:

$$Sh\_Y=(Sh\_X+(0.01\times255))/2,$$

$$Hi\_Y=(Hl\_X+(0.99\times255))/2$$

$$Mt\_Y=(Mt\_X+128)/2$$

In one USSIP technique, the one-dimensional look-up table L can then be computed, using the above-derived terms as well as a strength parameter s, by:

$$L(x) = (Hl\_Y - Sh\_Y)\left(\frac{x - Sh\_X}{Hl\_X - Sh\_X}\right)^{a2^{s\beta}} + Sh\_Y,$$

for $Sh\_X \le x \le Hl\_X$ where $$a = \log\left[\frac{(Mt\_Y - Sh\_Y)(Hl\_X - Sh\_X)}{(Mt\_X - Sh\_X)(Hl\_Y - Sh\_Y)}\right], \text{ and}$$

$$\beta = \left(\frac{Hl\_Y - Sh\_Y}{Mt\_Y - Sh\_Y}\right)\left(\frac{x - Sh\_X}{Hl\_X - Sh\_X}\right)^a - 1.$$

For x smaller than Sh_X, L(x)=x(Sh_Y/Sh_X), and for x larger than Hl_X, L(x)=255−(255−x)(255−Hl_Y)/(255−Hl_X).

Three Embodiments of the Present Invention

Figure 21:
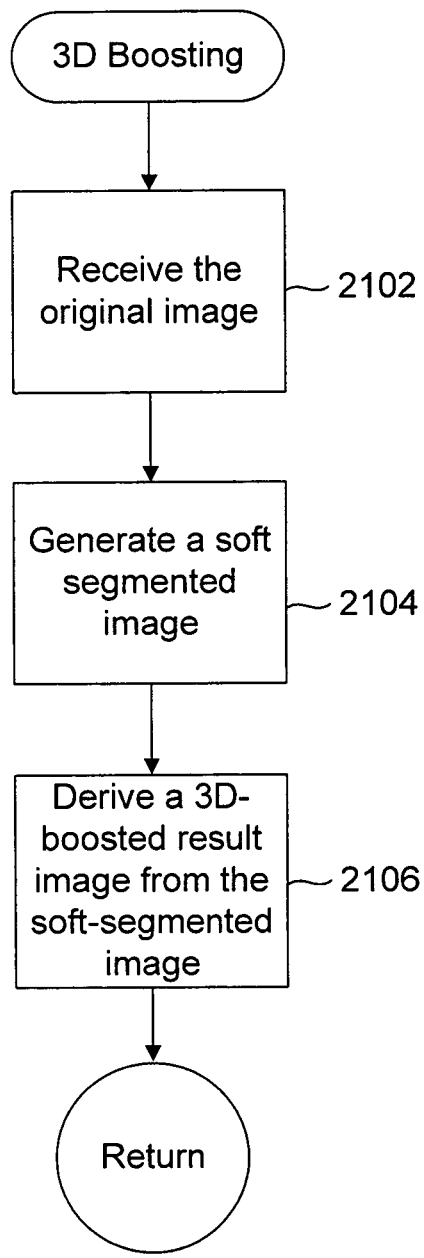
FIG. 21 is a simple flow-control diagram that illustrates the general concept of 3D boosting according to embodiments of the present invention.

FIG. 21 is a simple flow-control diagram that illustrates the general concept of 3D boosting according to embodiments of the present invention. In step 2102, an original image is received. In step 2104, a soft-segmented image is produced, by any number of different techniques, three of which are subsequently discussed. Then, in step 2106, a 3D-boosted, result image is produced from the soft-segmented image and the original image.

The soft-segmented image is a transformation of the original image that partitions the original image into relatively homogenous regions of flat contrast, with abrupt, high-contrast edges. The photographic mask, described in the above subsection that details the unified scheme for spatial image processing, is an example of a soft-segmented image. Another example of a soft-segmented image is an upper-envelop photographic mask, denoted subsequently as $\overline{PM}$, that is produced by various implementations of the well-known Retinex method. Versions of the Retinex method are described, for example, in the article "Improving the Retinex Algorithm for Rendering Wide Dynamic Range of Photographs," by Robert Sobol, *Journal of Electronic Imaling*, Volume 13(1)/65, January 2004 and also described in U.S. Pat. No. 6,941,028 B2. 3D boosting is a local contrast enhancement technique, as discussed above, that increases the perception, on behalf of a viewer, of depth in a two-dimensional image by increasing the contrast between shaded objects and fully illuminated objects and portions of objects that are shaded and fully illuminated portions of objects. 3D boosting therefore needs to be carried out on areas of mid-range contrast without increasing low-contrast noise and without sharpening or over-sharpening high-resolution, high-contrast detail.

Figure 22:
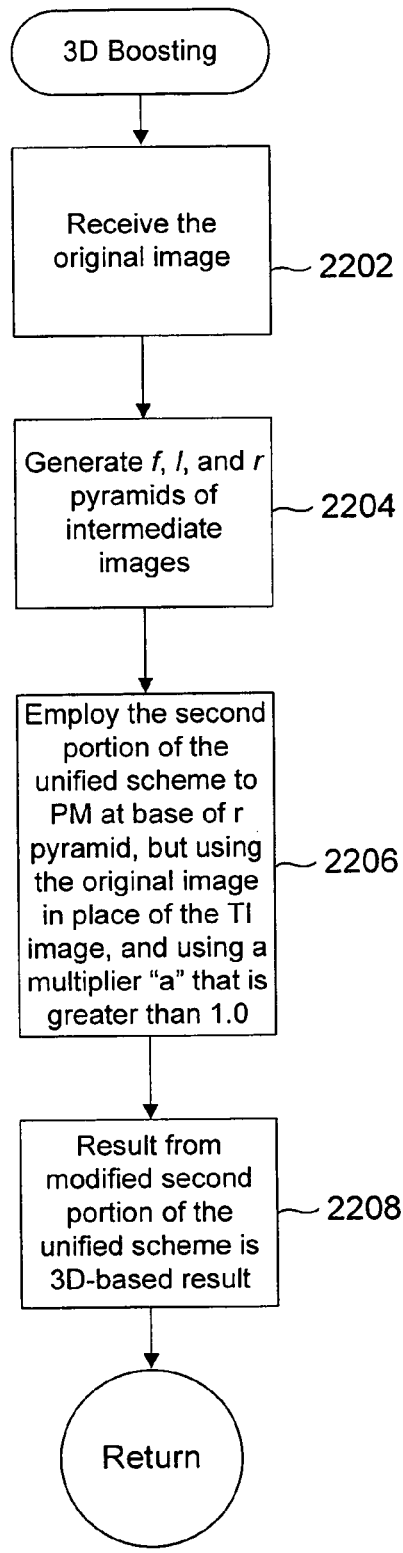
FIG. 22 is a more detailed version of FIG. 21, specific for the first embodiment.

Three different embodiments of the 3D-boosting method of the present invention are next described. FIG. 22 illustrates a first embodiment. FIG. 22 is a more detailed version of FIG. 21, specific for the first embodiment. In step 2202, the original image is received. Next, in step 2204, the above-described unified scheme for spatial image processing is employed, in part, to generate the low-pass, band-pass, and photographic-mask pyramids in order to generate the photograph mask PM. Then, in step 2206, the second portion of the unified scheme for spatial image processing, discussed above with reference to FIG. 10, is carried out, using in place of the temporary image (904 in FIG. 10) the original image $f_0$ (810 in FIG. 8A) generated by the pyramid-generation process and also received in step 2202, above. In addition, the multiplier "a" (1002 in FIG. 10) is multiplied by a constant greater than 1.0, in order to amplify the mid-range contrast portions of the image in order to effect 3D boosting. The result of this process is the 3D-boosted result of the first embodiment of 3D boosting illustrated in FIG. 22, as shown in step 2208. In a "pure 3D-boosting" operation, L is the identity and, consequently, a is 1.0. Therefore, multiplying a by a constant greater than one is equivalent to replacing a by that constant. When L is not identity, then other contrast enhancement effects are added to 3D-boosting.

Figure 23:
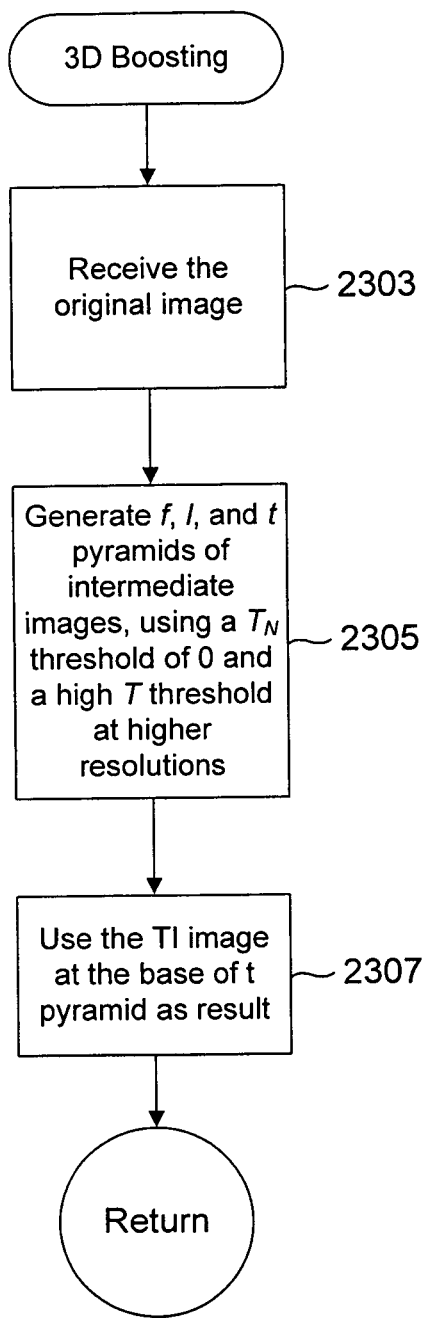
FIG. 23 illustrates a second approach to 3D boosting that represents an alternative embodiment of the present invention.

FIG. 23 illustrates a second approach to 3D boosting that represents an alternative embodiment of the present invention. In step 2303, the original image is received. Next, in step 2305, the above-described unified scheme for spatial image processing is used, in part, to generate the low-pass, band-pass, and temporary-image pyramids, with the temporary-image pyramids generated using a TN threshold of zero and a high T threshold at higher resolutions. Producing the temporary image ("TI") using these thresholds, the first portion of the unified scheme for spatial image processing results in the TI being a 3D-boosted transformation of the original image, as noted in step 2307. For a "pure 3D-boosting" effect, the amount of enhancement of the mid-contrast details should be constant across scales. When this amount varies, other effects may be achieve in addition to 3D-boosting. For instance, if the amount of enhancement increases as the scale becomes smaller (closer to the original scale), sharpening is achieved. Thus, both the first embodiment of the present invention, discussed with reference to FIG. 22, and the second embodiment of the present invention, discussed with reference to FIG. 23, employ portions of the above-described unified scheme for spatial image processing in order to produce a 3D-boosted image.

Figure 24:
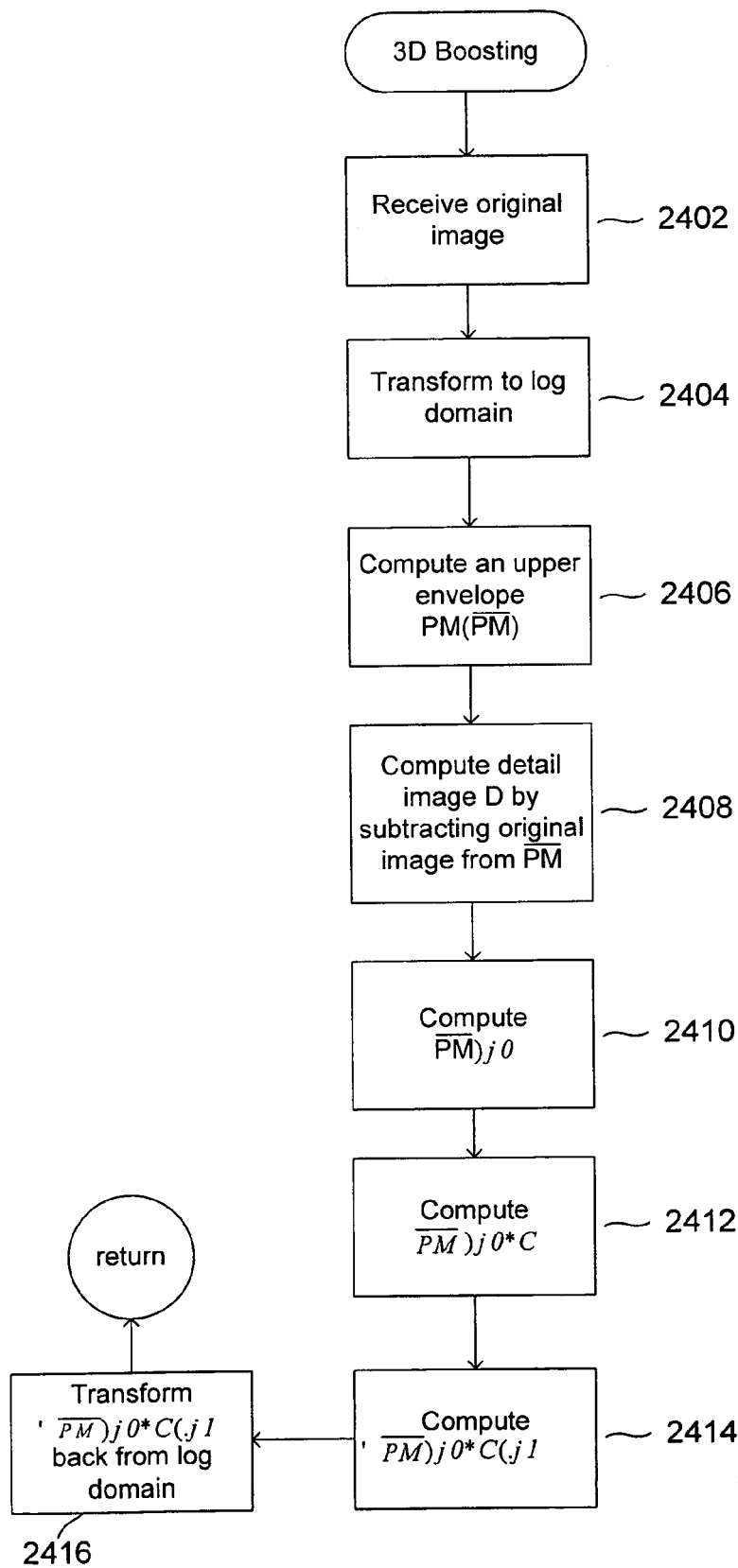
FIG. 24 is a control-flow diagram that illustrates the third embodiment of the present invention
Figure 25:
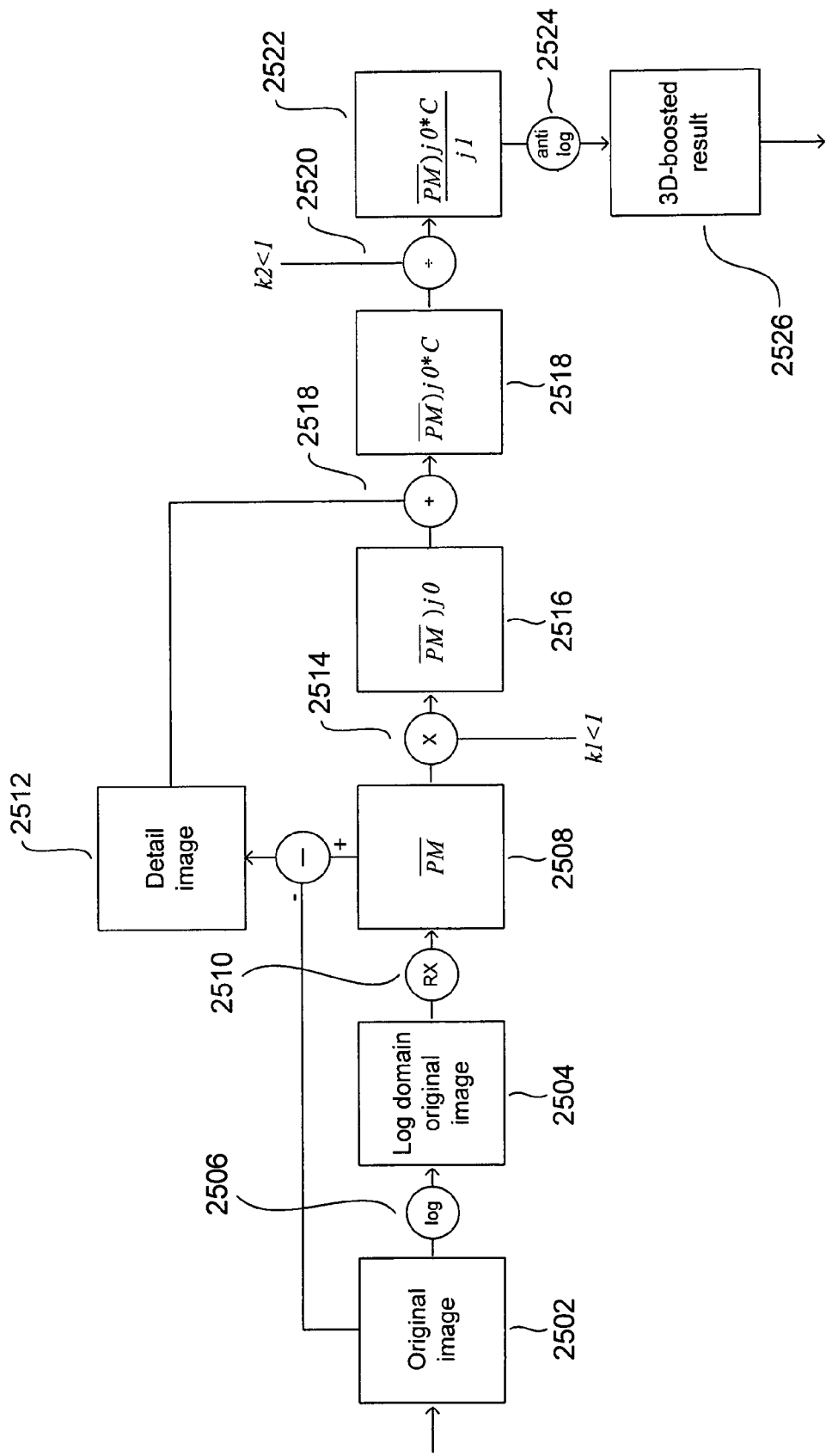
FIG. 25 illustrates the third embodiment of the present invention using a schematic-like technique.

FIGS. 24 and 25 illustrate a third embodiment of the present invention. FIG. 24 is a control-flow diagram that illustrates the third embodiment of the present invention, and FIG. 24 is a schematic-like diagram similar to FIGS. 9-11 in the above subsection describing the unified scheme for spatial image processing. Turning to FIG. 24, the original image is received in step 2402. Next, in step 2404, the original image is transformed to the log domain by taking the log values of the pixel values in the original image in a pixel-by-pixel fashion. The log values may be taken with respect to an arbitrary base, such as 2, e, or 10. Next, in step 2406, an upper envelop photographic mask $\overline{PM}$, is computed using any of various techniques, including the one computed by the well-known Retinex algorithm discussed in the above-cited references. In step 2408, the detail image D is computed by pixel-by-pixel subtracting the original image from $\overline{PM}$. In step 2410, $\overline{PM}$ is pixel-by-pixel multiplied by a first constant k1 to produce the image $\overline{PM}$*k1. In step 2412, the detail image D is added back, pixel-by-pixel, to the results of step 2410 to produce the image $\overline{PM}$*k1+D. In step 2414, the output from step 2412 is pixel-by-pixel divided by a second constant k2 less than 1.0 to produce the intermediate image ($\overline{PM}$*k1+D)/k2. This intermediate image output from step 2414 is then returned from the log domain back to the original-image domain, in step 2416, by a pixel-by-pixel anti-log operation to produce the final, 3D-boosted image.

FIG. 25 illustrates the third embodiment of the present invention using a schematic-like technique. Again, the original image 2502 is transferred to the log domain 2504 by a pixel-by-pixel logarithm operation 2506. The log domain image 2504 is then transformed to an upper-envelope photographic mask $\overline{PM}$, 2508 via any of a number of techniques, including the Retinex algorithm-based techniques 2510. A detail image 2512 is produced by pixel-by-pixel subtracting the original image 2502 from the $\overline{PM}$. The $\overline{PM}$ 2508 is modified by pixel-by-pixel multiplication by constant k1 which is less than 1.0 2514 to produce $\overline{PM}$*k1 2516. The detail image is added back to intermediate image 2516, pixel-by-pixel, to produce intermediate image 2520, $\overline{PM}*k1+D$. Intermediate image 2518 is then pixel-by-pixel divided by constant k2 which is less than 1.0 to produce intermediate image 2522, $$\frac{\overline{PM}*k1+D}{k2}.$$

Finally, in intermediate image 2522 is returned to the original-image domain via a pixel-by-pixel anti-log operation 2524 to produce the resulting 3D-boosted image 2526.

Although the present invention has been described in terms of particular embodiments, it is not intended that the invention be limited to these embodiments. Modifications within the spirit of the invention will be apparent to those skilled in the art. For example, any number of different embodiments of the present invention can be obtained through varying various programming parameters, including programming language, control structures, data structures, modular organization, variable names, and other such programming parameters. The method and system embodiments of the present invention can be tailored to specific applications by adjusting a number of different parameters. For example, any number of different embodiments of the present invention can be obtained by using different one-dimensional look-up tables. As another example, a variety of different intermediate-image computations can be employed, using larger windows, different thresholds and thresholding functions, different scalings, and by varying other such parameters. As yet another example, the third embodiment of the present invention can also be carried out in the input-picture domain, rather than the log domain, using multiplication operations in place of addition operations, division operations in place of subtraction operations, and exponential or power operations in place of multiplications and divisions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A signal-processing system comprising:
a memory for storing machine readable instructions; and
a processing unit to access the memory and execute the machine readable instructions, the machine readable instructions comprising:
  a signal-processing routine executed by the processing component that enhances an input image to produce an output image with enhanced depth perception relative to the input image by:
    computing a soft-segmented image from the input image, wherein the soft-segmented image comprises a plurality of partitions of the input image, wherein each partition of the input image comprises a relatively homogenous region, with a flat contrast and abrupt, high contrast edges; and
    deriving, from the soft-segmented image and the input image, the enhanced, output image with enhanced depth perception;
  wherein the output image with enhanced depth perception is locally contrast enhanced to provide, to a viewer of the output image with enhanced depth perception, a greater perception of depth, due to enhancement of contrast between shaded and illuminated portions of objects with respect to the input image; and
  wherein the flat contrast of the relatively homogenous region of each partition of the soft-segmented image is approximately equal to a definable function of a local average of a corresponding segment in the output image with enhanced depth perception, and the high contrast edges of each partition of the soft-segmented image corresponds in location to high contrast edges in the output image with enhanced depth perception.

2. The signal-processing system of claim 1 wherein computing a soft-segmented image from the input image and deriving, from the soft-segmented image and the input image, output image with enhanced depth perception further comprises:
  generating, according to a unified scheme for spatial image processing, low-pass, band-pass, and photographic-mass intermediate-image pyramids; and
  employing a second, look-up-table-based portion the unified scheme for spatial image processing, substituting, for the temporary image used in the second, look-up-table-based portion the unified scheme for spatial image processing, the input image and multiplying the multiplier "a" by a second multiplier greater than 1.0 to achieve contrast enhancement that produces enhanced depth perception.

3. The signal-processing system of claim 1 wherein computing a soft-segmented image from the input image and deriving, from the soft-segmented image and the input image, the enhanced, output image with enhanced depth perception further comprises:
  generating, according to a unified scheme for spatial image processing, low-pass, band-pass, and temporary-image intermediate-image pyramids, using a $T_N$ threshold of 0.0 and a high T threshold at higher-resolution scales to compute the temporary-image intermediate-image pyramid; and
  returning, as the enhanced, output image with enhanced depth perception, the highest-resolution temporary-image intermediate image of the temporary-image intermediate-image pyramid.

4. A signal-processing system comprising:
a memory for storing machine readable instructions; and
a processing unit to access the memory and execute the machine readable instructions, the machine readable instructions comprising:
  a signal-processing routine executed by the processing component that enhances an input image to produce an output image with enhanced depth perception relative to the input image by:
    computing a soft-segmented image from the input image, wherein the soft-segmented image comprises a plurality of partitions of the input image, wherein each partition of the input image comprises a relatively homogenous region, with a flat contrast and abrupt, high contrast edges wherein computing the soft-segmented image from the input image comprises:
  transforming the input image to a log-domain intermediate image using a pixel-by-pixel logarithm operation; and
  computing an upper-envelope photographic mask from the log-domain intermediate image; and
deriving, from the soft-segmented image and the input image, the enhanced, output image with enhanced depth perception;
wherein the output image with enhanced depth perception is locally contrast enhanced to provide, to a viewer of the output image with enhanced depth perception, a greater perception of depth, due to enhancement of contrast between shaded and illuminated portions of objects with respect to the input image;
wherein deriving, from the soft-segmented image and the input image, the enhanced, output image with enhanced depth perception further comprises:
computing a detail image D from the upper-envelope photographic mask $\overline{PM}$ by pixel-by-pixel subtraction the input image from the upper-envelope photographic mask $\overline{PM}$;
computing, by a pixel-by-pixel multiplication of $\overline{PM}$ by a constant k1 less than 1.0, a $\overline{PM}$*k1 intermediate image;
computing a $\overline{PM}$*k1+D intermediate image by pixel-by-pixel addition of the detail image D to the $\overline{PM}$*k1 intermediate image;
computing a ($\overline{PM}$*k1+D)/k2 intermediate image by pixel-by-pixel division of the $\overline{PM}$*k1+D intermediate image by a constant k2 less than 1.0; and
transforming the ($\overline{PM}$*k1+D)/k2 intermediate image by a pixel-by-pixel antilog operation.

5. A method that enhances an input image to produce an enhanced output image, the method comprising:
  computing, by a processor-controlled image-processing system, a soft-segmented image from the input image, wherein the processor-controlled image-processing system comprises a memory for storing machine readable instructions and a processing unit for accessing the memory and executing the machine readable instructions and wherein the soft-segmented image comprises a plurality of partitions of the input image, wherein each partition of the input image comprises a relatively homogenous region, with a flat contrast and abrupt, high contrast edges; and
  deriving, by the processor-controlled image-processing system, from the soft-segmented image, the output image with enhanced depth perception;
  wherein the output image with enhanced depth perception is locally contrast enhanced to provide, to a viewer of the visually-rendered output image with enhanced depth perception, a greater of depth, due to enhancement of contrast between shaded and illuminated portions of objects and shaded and illuminated objects with respect to the input image and
  wherein the flat contrast of the relatively homogenous region of each partition of the soft-segmented image is approximately equal to a definable function of a local average of a corresponding segment in the output image with enhanced depth perception, and the high contrast edges of each partition of the soft-segmented image corresponds in location to high contrast edges in the output image with enhanced depth perception.

6. The method of claim 5 wherein computing a soft-segmented image from the input image and deriving, from the soft-segmented image and the input image, the output image with enhanced depth perception further comprises:
  generating, according to a unified scheme for spatial image processing, low-pass, band-pass, and photographic-mass intermediate-image pyramids; and
  employing a second, look-up-table-based portion the unified scheme for spatial image processing, substituting, for the temporary image used in the second, look-up-table-based portion the unified scheme for spatial image processing, the input image and multiplying the multiplier "a" by a second multiplier greater than 1.0 to achieve contrast enhancement that produces enhanced depth perception.

7. The method of claim 5 wherein computing a soft-segmented image from the input image and deriving, from the soft-segmented image and the input image, the enhanced, output image with enhanced depth perception further comprises:
  generating, according to a unified scheme for spatial image processing, low-pass, band-pass, and temporary-image intermediate-image pyramids, using a $T_N$ threshold of 0.0 and a high T threshold at higher-resolution scales to compute the temporary-image intermediate-image pyramid; and
  returning, as the output image with enhanced depth perception, the highest-resolution temporary-image intermediate image of the temporary-image intermediate-image pyramid.

8. A method that enhances an input image to produce an enhanced output image, the method comprising:
  computing, by a processor-controlled image-processing system, a soft-segmented image from the input image, wherein the processor-controlled image-processing system comprises a memory for storing machine readable instructions and a processing unit for accessing the memory and executing the machine readable instructions and wherein the soft-segmented image comprises a plurality of partitions of the input image, wherein each partition of the input image comprises a relatively homogenous region, with a flat contrast and abrupt, high contrast edges;
  wherein computing the soft-segment image comprises:
    transforming the input image to a log-domain intermediate image using a pixel-by-pixel logarithm operation; and
    computing an upper-envelope photographic mask from the log-domain intermediate image; and
  deriving, by the processor-controlled image-processing system, from the soft-segmented image, the output image with enhanced depth perception;
  wherein the output image with enhanced depth perception is locally contrast enhanced to provide, to a viewer of the visually-rendered output image with enhanced depth perception, a greater of depth, due to enhancement of contrast between shaded and illuminated portions of objects and shaded and illuminated objects with respect to the input image.
  wherein deriving, from the soft-segmented image and the input image, the output image with enhanced depth perception further comprises:
  computing a detail image D from the upper-envelope photographic mask $\overline{PM}$ by pixel-by-pixel subtraction the input image from the upper-envelope photographic mask $\overline{PM}$;
  computing, by a pixel-by-pixel multiplication of $\overline{PM}$ by a constant k1 less than 1.0, a $\overline{PM}$*k1 intermediate image;

computing a $\overline{PM}*k1+D$ intermediate image by pixel-by-pixel addition of the detail image D to the $\overline{PM}*k1$ intermediate image;

computing a $(\overline{PM}*k1+D)/k2$ intermediate image by pixel-by-pixel division of the $\overline{PM}*k1+D$ intermediate image by a constant k2 less than 1.0; and transforming the $(\overline{PM}*k1+D)/k2$ intermediate image by a pixel-by-pixel antilog operation.

\* \* \* \* \*

UNITED STATES PATENT AND TRADEMARK OFFICE
CERTIFICATE OF CORRECTION

PATENT NO. : 8,457,429 B2
APPLICATION NO. : 11/888573
DATED : June 4, 2013
INVENTOR(S) : Renato Keshet et al.

It is certified that error appears in the above-identified patent and that said Letters Patent is hereby corrected as shown below:

In the Specification:
In column 3, line 40 delete "RBG" and insert -- RGB --, therefor.
In column 4, line 53 delete "4B1" and insert -- 4B --, therefor.
In column 9, line 20 delete "USSWP" and insert -- USSIP --, therefor.
In column 10, line 8 delete "iniagefo" and insert -- image --, therefor.
In column 12, line 28 delete "imagef" and insert -- image --, therefor.
In column 17, line 43 delete "precdomputed" an insert -- precomputed --, therefor.
In column 19, line 40 delete "Imaling" and insert -- Imaging --, therefor.
(Amendments to claims filed on Nov. 2, 2012, page 5, in claim 7, line 16)

In the Claims:
In column 23, line 57, in Claim 5, delete "image" and insert -- image; --, therefor.
In column 24, line 58, in Claim 8, delete "image." and insert -- image; --, therefor.
(Amendments to claims filed on Nov. 2, 2012, page 7, in claim 12, line 12)

Signed and Sealed this
Seventeenth Day of September, 2013

Teresa Stanek Rea
*Deputy Director of the United States Patent and Trademark Office*